(12) United States Patent
Grocutt

(10) Patent No.: US 10,782,972 B2
(45) Date of Patent: Sep. 22, 2020

(54) VECTOR PREDICATION INSTRUCTION

(71) Applicant: ARM LIMITED, Cambridge (GB)

(72) Inventor: Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 114 days.

(21) Appl. No.: 16/079,241

(22) PCT Filed: Mar. 17, 2017

(86) PCT No.: PCT/GB2017/050737
§ 371 (c)(1),
(2) Date: Aug. 23, 2018

(87) PCT Pub. No.: WO2017/163024
PCT Pub. Date: Sep. 28, 2017

(65) Prior Publication Data
US 2019/0050226 A1 Feb. 14, 2019

(30) Foreign Application Priority Data
Mar. 23, 2016 (GB) .................................. 1604943.9

(51) Int. Cl.
*G06F 9/30* (2018.01)

(52) U.S. Cl.
CPC ........ *G06F 9/3016* (2013.01); *G06F 9/30018* (2013.01); *G06F 9/30036* (2013.01); *G06F 9/30072* (2013.01)

(58) Field of Classification Search
None
See application file for complete search history.

(56) References Cited

U.S. PATENT DOCUMENTS 7,051,180 B2 * 5/2006 Downer ................ G06F 9/5061
709/215
9,519,479 B2 * 12/2016 Le ........................ G06F 9/30018
(Continued)

FOREIGN PATENT DOCUMENTS

EP    1 267 258    12/2002
EP    1 347 374    9/2003
(Continued)

OTHER PUBLICATIONS

International Search Report and Written Opinion of the ISA for PCT/GB2017/050737, dated Jun. 20, 2017, 11 pages.
(Continued)

*Primary Examiner* — Eric Coleman
(74) *Attorney, Agent, or Firm* — Nixon & Vanderhye P.C.

(57) ABSTRACT

An apparatus comprises processing circuitry (4) and an instruction decoder (6) which supports vector instructions for which multiple lanes of processing are performed on respective data elements of a vector value. In response to a vector predication instruction, the instruction decoder (6) controls the processing circuitry (4) to set control information based on the outcome of a number of element comparison operations each for determining whether a corresponding element passes or fails a test condition. The control information controls processing of a predetermined number of subsequent vector instructions after the vector predication instruction. The predetermined number is hard-wired or identified by the vector predication instruction. For one of the subsequent vector instructions, an operation for a given portion of a given lane of vector processing is masked based on the outcome indicated by the control information for a corresponding data element.

23 Claims, 12 Drawing Sheets

(56) References Cited

U.S. PATENT DOCUMENTS

| | | | |
|---|---|---|---|
| 2002/0087846 A1* | 7/2002 | Nickolls | G06F 9/3001 |
| | | | 712/229 |
| 2008/0016320 A1* | 1/2008 | Menon | G06F 9/30014 |
| | | | 712/22 |
| 2014/0006755 A1* | 1/2014 | Gueron | G06F 7/52 |
| | | | 712/222 |
| 2014/0052968 A1* | 2/2014 | Corbal | G06F 9/3001 |
| | | | 712/222 |
| 2014/0059328 A1 | 2/2014 | Gonion | |
| 2015/0154024 A1 | 6/2015 | Anderson et al. | |
| 2015/0227367 A1* | 8/2015 | Eyole-Monono | ............................ |
| | | | G06F 9/30036 |
| | | | 712/7 |

FOREIGN PATENT DOCUMENTS

| | | |
|---|---|---|
| EP | 2 273 359 | 1/2011 |
| EP | 2 806 354 | 11/2014 |
| GB | 2 470 782 | 12/2010 |

OTHER PUBLICATIONS

Combined Search and Examination Report for GB 1604943.9, dated Aug. 26, 2016, 8 pages.

* cited by examiner

| VPT syntax | Mask | no. of subsequent vector instructions to predicate | I0 | I1 | I2 | I3 |
|---|---|---|---|---|---|---|
| VPT | 1000 | 1 | T | – | – | – |
| VPTT | 0100 | 2 | T | T | – | – |
| VPTE | 1100 | 2 | T | E | – | – |
| VPTTT | 0010 | 3 | T | T | T | – |
| VPTTE | 0110 | 3 | T | T | E | – |
| VPTEE | 1010 | 3 | T | E | E | – |
| VPTET | 1110 | 3 | T | E | T | – |
| VPTTTT | 0001 | 4 | T | T | T | T |
| VPTTTE | 0011 | 4 | T | T | T | E |
| VPTTEE | 0101 | 4 | T | T | E | E |
| VPTTET | 0111 | 4 | T | T | E | T |
| VPTEEE | 1001 | 4 | T | E | E | E |
| VPTEET | 1011 | 4 | T | E | E | T |
| VPTETT | 1101 | 4 | T | E | T | T |
| VPTETE | 1111 | 4 | T | E | T | E |

FIG. 9

VECTOR PREDICATION INSTRUCTION

This application is the U.S. national phase of International Application No. PCT/GB2017/050737 filed Mar. 17, 2017, which designated the U.S. and claims priority to GB Patent Application No. 1604943.9 filed Mar. 23, 2016, the entire contents of each of which are hereby incorporated by reference.

The present technique relates to the field of data processing. More particularly, it relates to the processing of vector instructions.

Some data processing systems support processing of vector instructions for which a source operand or result value of the instruction is a vector comprising multiple data elements. By supporting the processing of a number of distinct data elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising:
processing circuitry to perform data processing; and
an instruction decoder to decode a vector instruction to control the processing circuitry to perform a plurality of lanes of vector processing corresponding to respective data elements of a vector value;
wherein in response to a vector predication instruction, the instruction decoder is configured to control the processing circuitry to set, in dependence on a plurality of element comparison operations each for determining whether a corresponding data element of a target vector value passes or fails a test condition, control information for controlling processing of a predetermined number of subsequent vector instructions after said vector predication instruction within a sequence of instructions to be processed, wherein said predetermined number is hardwired or identified by the vector predication instruction; and
in response to one of said predetermined number of subsequent vector instructions, the instruction decoder is configured to control the processing circuitry to determine whether to mask an operation associated with a given portion of a given lane of vector processing in dependence on an outcome of the element comparison operation indicated by the control information for a data element of the target vector value corresponding to said given portion;
wherein in response to at least one type of vector instruction, the instruction decoder is configured to control the processing circuitry to perform an additional operation independent of said plurality of lanes of vector processing; and
the processing circuitry is configured to perform the additional operation independent of the control information when one of said predetermined number of subsequent vector instructions is one of said at least one type of vector instruction.

At least some examples provide an apparatus comprising:
means for performing data processing; and
means for decoding a vector instruction to control the processing circuitry to perform a plurality of lanes of vector processing corresponding to respective data elements of a vector value;
wherein in response to a vector predication instruction, the means for decoding is configured to control the means performing data processing to set, in dependence on a plurality of element comparison operations each for determining whether a corresponding data element of a target vector value passes or fails a test condition, control information for controlling processing of a predetermined number of subsequent vector instructions after said vector predication instruction within a sequence of instructions to be processed, wherein said predetermined number is hardwired or identified by the vector predication instruction; and
in response to one of said predetermined number of subsequent vector instructions, the means for decoding is configured to control the means for processing to determine whether to mask an operation associated with a given portion of a given lane of vector processing in dependence on an outcome of the element comparison operation indicated by the control information for a data element of the target vector value corresponding to said given portion;
wherein in response to at least one type of vector instruction, the means for decoding is configured to control the means for performing data processing to perform an additional operation independent of said plurality of lanes of vector processing; and
the means for performing data processing is configured to perform the additional operation independent of the control information when one of said predetermined number of subsequent vector instructions is one of said at least one type of vector instruction.

At least some examples provide a data processing method for processing vector instructions for controlling processing circuitry to perform a plurality of lanes of vector processing corresponding to respective data elements of a vector value; the method comprising:
decoding a vector predication instruction to control the processing circuitry to set, in dependence on a plurality of element comparison operations each for determining whether a corresponding data element of a target vector value passes or fails a test condition, control information for controlling processing of a predetermined number of subsequent vector instructions after said vector predication instruction within a sequence of instructions to be processed, wherein said predetermined number is hardwired or identified by the vector predication instruction; and
in response to one of said predetermined number of subsequent vector instructions, decoding the subsequent vector instruction to control the processing circuitry to determine whether to mask an operation associated with a given portion of a given lane of vector processing in dependence on an outcome of the element comparison operation indicated by the control information for a data element of the target vector value corresponding to said given portion;
wherein when one of said predetermined number of subsequent vector instructions is a type of vector instruction for which the processing circuitry is to perform an additional operation independent of said plurality of lanes of vector processing, the processing circuitry is controlled to perform the additional operation independent of the control information.

At least some examples provide a virtual machine computer program comprising program instructions to control a host data processing apparatus to provide an instruction execution environment corresponding to the apparatus discussed above.

A computer-readable storage medium storing the virtual machine computer program can also be provided. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus supporting execution of vector instructions;

FIG. 9 is a table showing different encodings of a mask field for controlling how many subsequent vector instructions are affected by the predication instruction;

Figure 1:
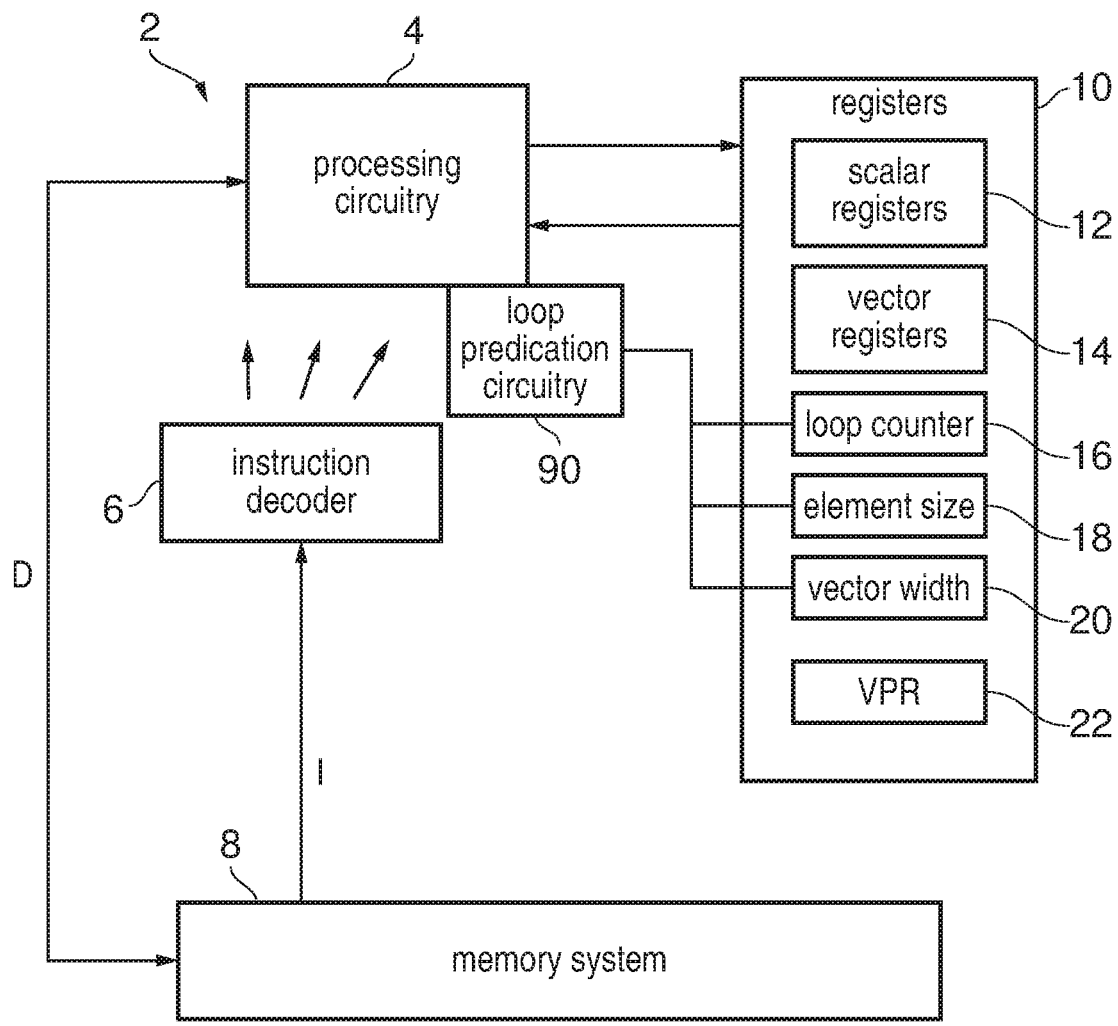

Some specific examples will be discussed below. It will be appreciated that the invention is not limited to these exact examples.

In some program applications, there may be a need for data-dependent control flow of vector processing, where certain vector operations are applied only to selected lanes of vector processing depending on the values of elements of a target vector corresponding to those lanes. Hence, it can be useful to provide instruction support for comparing the elements of a target vector against a test condition, and to select whether to mask operations associated with some portions of a vector based on the outcome of the comparison for corresponding elements of the target vector.

One approach for doing this is to provide a bank of multiple predicate registers in hardware, to which the outcomes of element comparisons can be written by comparison instructions, and which can be referenced by a subsequent instruction to control predication of some lanes of vector processing for the subsequent instructions. However, a problem with this approach is that the bank of predicate registers increases the circuit area and power consumption of the register file, which can be critical on relatively simple processors for which power efficiency is one of the most important criteria, and also this increases the amount of register state that is saved or restored when handling exceptions which can increase the complexity of the processor. Also, encoding space in the instruction set may be at a premium, and this approach would generally require adding a predication register field to every type of vector instruction, so would increase the instruction encoding width required, which in turn increases power in caching, fetching, decoding and processing the instructions.

Instead, processing circuitry may be provided with an instruction decoder which supports decoding of a vector predication instruction dedicated to controlling the predication of a number of subsequent vector instructions. In response to the vector predication instruction, the decoder controls the processing circuitry to set, in dependence on a number of element comparison operations each for determining whether a corresponding data element of a target vector value passes or fails a test condition, control information for controlling processing of a predetermined number of subsequent vector instructions after the vector predication instruction within a sequence of instructions to be processed. In response to one of the subsequent vector instructions, the instruction decoder controls the processing circuitry to determine whether to mask an operation associated with a given portion of a given lane of vector processing based on the control information set by the processing circuitry in response to the vector predication instruction. Masking for a given portion of a given lane is determined in dependence on an outcome of the element comparison operation indicated by the control information for a data element of the target vector value which corresponds to that given portion.

Hence, by providing a dedicated vector predication instruction which sets the control information based on the element comparison operations and controls selective masking of parts of vector processing for a predetermined number of subsequent vector instructions, it is not necessary for the subsequent instructions to specify predicate register specifiers in their encoding. The encoding of the subsequent vector instructions can be exactly the same as if the subsequent vector instructions were not being predicated. Hence, exactly the same instruction may, if following a vector predication instruction, trigger a different behaviour of the processor than if that same instruction appeared not following a vector predication instruction. By allocating a special vector predication instruction (e.g. using a different opcode), this avoids increasing the instruction encoding size for the subsequent vector instructions for which encoding space is usually at a premium. This approach also simplifies exception handling since there is no need to save or restore multiple sets of predicate register state, and avoids the need to provide multiple predicate registers in hardware.

In some examples, the predetermined number of subsequent vector instructions which are affected by the vector predication instruction can be hardwired, so that there is always a fixed number of subsequent vector instructions which are controlled in dependence of the control information. For example, in some examples the predetermined number may be hardwired to be one, so that when a vector predication instruction is encountered, the immediately following subsequent vector instruction is controlled in dependence of the control information but the instruction after that is then processed independently from the control information.

However, in other examples the predetermined number may be identified by the vector predication instruction. Hence, the vector predication instruction may specify a control parameter which identifies how many subsequent vector instructions should be controlled in dependence on the control information. For example, an architecture may support a variable number of subsequent vector instructions being specified by the vector predication instruction up to some maximum number of instructions. For example, the maximum number could be four or eight instructions. By enabling multiple instructions to be predicated by a single vector predication instruction, this improves code density and reduces fetch/decode overhead compared to predicating different instructions individually with different vector predication instructions.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations. The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing logic. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector value comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12. Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed.

The register bank 10 also includes registers for storing control information for controlling the operation of the processing circuitry 4. The control registers may include registers such as a program counter register for indicating an address of an instruction corresponding to a current point of execution, a stack pointer register indicating an address of a location in the memory system 8 of a stack data structure for saving/restoring register state when handling of the exception, and a link register for storing a function return address to which processing is to branch following the execution of a function. These are not illustrated in FIG. 1 for conciseness.

As shown in FIG. 1, the registers also include a loop counter 16 for tracking the progress of vectorised loops, an element size register 18 for storing a parameter indicating the number of bits in each data element in a vector currently being processed, a vector width register 20 for storing a parameter indicating the total number of bits in one vector register and a vector predicate register 22 for controlling predication of vector operations. These will be described in more detail below. In some examples, the vector width register 20 may be hardwired during the manufacture of the apparatus depending on the particular vector width implemented in the vector registers 14 for a given device. Alternatively, if the vector register file 14 supports different configurations with different vector widths then the vector width register 20 could be programmable to indicate the current width being used. Similarly, the element size register 18 could either be hardwired if a particular element size is always used for a given apparatus, or variable if the apparatus supports processing with vectors of different data element size. In some examples, the element size register 18 may be omitted, for example if each vector instruction specifies the element size to be used for that instruction. While the loop counter 16 is shown as a dedicated control register, other examples may use one of the general purpose scalar registers 12 to track the progress of vectorised loops.

Figure 2:
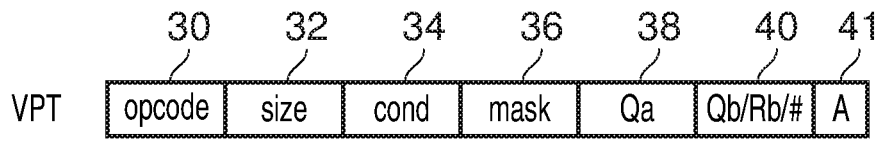
FIG. 2 shows an example of an encoding of a vector predication instruction.

FIG. 2 shows an example of a vector predication instruction (VPT instruction) for controlling predication of a predetermined number of subsequent vector instructions. The vector predication instruction specifies a number of fields including:

an opcode 30 identifying that this instruction is a VPT instruction;

an element size field 32 specifying the size of the data elements of the target vector to be processed by the VPT instruction;

a condition field 34 specifying a test condition to be applied by the vector predication instruction. For example, the test condition can be specified as one of EQ (equals), NE (not equal to), GT (greater than), GE (greater than or equal to), LT (less than), LE (less than or equal to);

a mask field 36 specifying a mask value for controlling how many subsequent vector instructions are predicated by the vector predication instruction. The mask field may also identify whether at least one of the subsequent vector instruction should be treated as a then-condition vector instruction ("T instruction") or else-condition vector instruction ("E instruction"). For T instructions, operations are masked for a given portion of a vector if the corresponding element of the target vector tested by the VPT instruction failed its test condition. For E instructions, operations are masked for a given portion of a vector if the corresponding element of the target vector tested by the VPT instruction passed its test condition.

a target vector register field 38 specifying a vector register Qa storing the target vector value for which the test condition is to be applied element-by-element;

a comparison value field 40 specifying a reference value for comparing against the target vector; and a combine flag field 41 specifying whether the predicate conditions in the vector predicate register 22 should be set to the results of the comparison operations for determining whether each element of the target vector satisfies the test condition, or whether the predicate conditions in the vector predicate register 22 should be set to the results of the comparison operations combined with the previous value of the predicate conditions in the vector predicate register 22.

It will be appreciated that FIG. 2 merely shows an example of a possible encoding of the VPT instruction. Which particular bits of the instruction encoding are allocated to each field is an arbitrary design choice for a particular implementation.

The VPT instruction triggers a series of element comparison operations each corresponding to a respective one of the elements of the target vector. Different forms of VPT instructions may be provided (identified by different opcodes or by a further field of the instruction identifying the type of comparison), each providing a different type of comparison:

for a vector-comparison VPT instruction, the comparison value field 40 specifies a second vector register Qb storing a further vector value, and each element comparison operation compares a given element of the target vector in register Qa with a corresponding element of the further vector in register Qb.

for a scalar-comparison VPT instruction, the comparison value field 40 specifies a scalar register Rb storing a scalar value, and each of the element comparisons compares a corresponding element of the target vector in register Qa against the same scalar value in register Rb.

for a constant-comparison VPT instruction, each element comparison compares the corresponding data element of the target vector in register Qa with a predetermined constant. The constant could be identified as an immediate value in the comparison value field 40, or could be a predetermined value (e.g. 0) implicit from the opcode identifying the constant-comparison VPT instruction.

Figure 3:
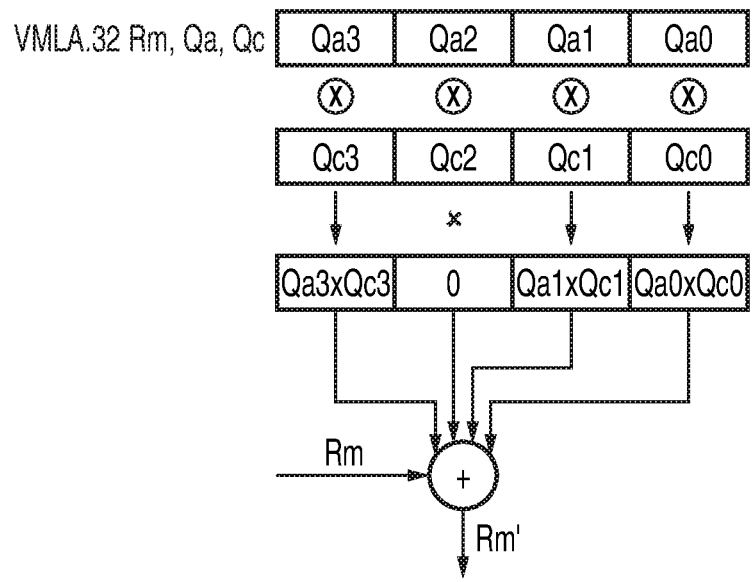
FIG. 3 shows an example of using the vector predication instruction to control masking of portions of lanes of processing performed in response to a subsequent vector instruction.

FIG. 3 schematically illustrates an example of an operation performed in response to the VPT instruction. In this example, the VPT instruction is of the vector-comparison form and so the second register field 40 specifies a vector register Qb. The condition field 34 in this case specifies the GT condition, and so in response to the VPT instruction, the instruction decoder 6 generates control signals which control the processing circuitry 4 to perform a number of element comparison operations with each element comparison operation comparing corresponding data elements Qai, Qbi of the vectors Qa and Qb to determine whether the element Qai of vector Qa is greater than the corresponding element Qbi of vector Qb (where i is between 0 and 3 in this example). In response to the VPT instruction, the processing circuitry 4 sets control information to the vector predicate register (VPR) 22 indicating the outcome of each of the element comparison operations. In this example, for lanes 0, 1 and 3, the corresponding element in vector Qa was greater than the corresponding element in vector Qb and so the test condition was passed. On the other hand, for lane 2, Qa2 Qb2 and so the GT test condition was failed.

When executing one of a predetermined number of subsequent vector instructions following the VPT instruction, such as a vector multiply add (VMLA) instruction shown in the example at FIG. 3, the processing circuitry 4 reads the control information set in the VPR 22, and controls whether an operation associated with a given portion of a given lane of vector processing is masked based on the outcome of the comparison operation indicated by the control information for a corresponding element of the target vector compared by the VPT instruction. In this example, the data element size is the same for the VMLA instruction as for the VPT instruction, and so each lane of processing for the VMLA instruction corresponds to a single element of the VPT instruction and is masked or not masked according to the outcome of the corresponding element comparison operation. Hence, for lane 0, 1 and 3, the VMLA instruction multiplies corresponding elements of vectors Qa, Qc and accumulates the products of these multiplications into a scaler register Rn. Since the test condition was failed in lane 2, the operation associated with this lane is masked, and so the products Qa2*Qc2 does not affect the value in scalar register Rn.

Masking the operation in lane 2 could be carried out in different ways. For example, the multiplication of the elements in lane 2 could be suppressed altogether. Alternatively, the multiplication could still be performed, but adding of its result to the destination register is suppressed. In general, the masking may be carried out in any way which ensures that the vector processing for a masked portion of the vector does not affect the outcome of the instruction. For example, an enable signal may be provided for each portion of the vector, which controls whether the result of that portion is written to a destination register.

While FIG. 3 shows an example of a single instruction being predicated by the preceding VPT instruction, the VPT instruction may predicate multiple subsequent instructions (up to some maximum number) and the mask field 36 may specify how many instructions should be controlled in dependence on the control information. This will be discussed in more detail below.

Figure 4:
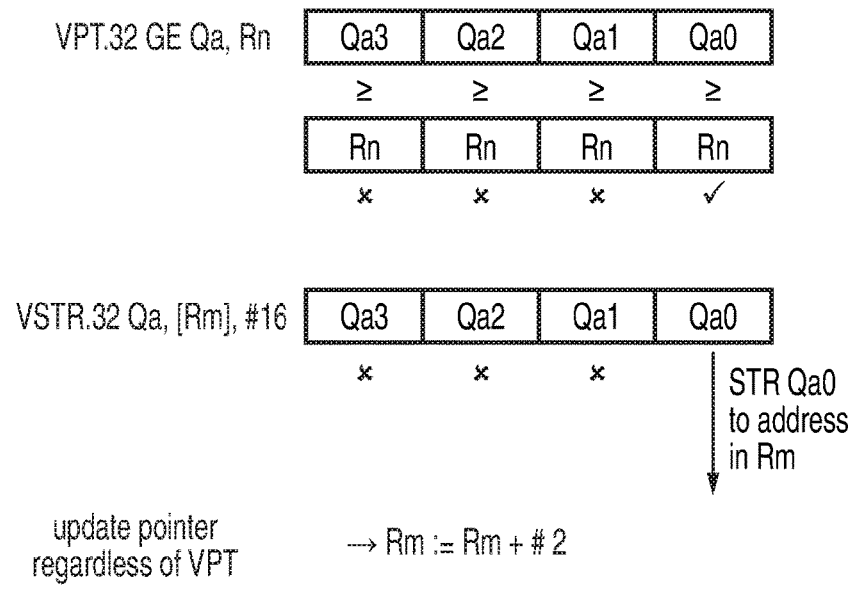
FIG. 4 shows an example in which an additional operation for updating an address pointer is performed in response to a subsequent vector instruction independently of the outcome of the vector predication instruction.

FIG. 4 shows a second example of use of the VPT instruction. This time the VPT instruction is a scalar-comparison VPT instruction and so each of the data elements of the target vector Qa are compared against the same scaler value from register Rn. This time the test condition applied is GE and it is passed in lane 0 and failed in lanes 1 to 3. The subsequent vector instruction in this example is a vector store (VSTR) instruction for which each lane of vector processing comprises a store operation to store a corresponding element of a vector operand Qa to a location in memory calculated based on a pointer address in a scalar register Rn. However, since the VPT instruction failed the test condition for lanes 1 to 3, in this case only the store operation for lane 0 is carried out, while the store operations for lanes 1 to 3 are masked (hence no store requests are sent to the memory system 8 for the elements in lanes 1 to 3).

Unlike the example in FIG. 3, for the store instruction in FIG. 4 the instruction decoder 6 decodes the store instruction to control the processing circuitry 4 to perform an additional pointer updating operation which is independent of the lanes of vector processing, in addition to the store operations corresponding to the respective lanes of vector processing themselves (some store operations may update the pointer prior to calculating the address to be used for the stores while other forms may update the pointer afterwards). Regardless of whether pre-store or post-store incrementing of the pointer is used, the pointer update operation shown at the bottom of FIG. 4 to add an immediate value to the scalar register Rn may be performed regardless of whether the VPT instruction passed or failed the respective test conditions in each lane. That is, the pointer data operation may be an additional operation which is performed independently of the control information set by the VPT instruction. Hence, regardless of the outcome of the VPT instruction, the pointer updating operation proceeds anyway. The predication affects the lanes of vector processing for the subsequent instructions, but another non-vector operation triggered by one of the subsequent instructions which is independent of the lanes of vector processing, such as a scalar register update, is not affected by the lane masking. The additional non-vector operation is performed even if the VPT instruction results in all of the lanes of a given vector instruction being masked.

The VPT instruction discussed above can be useful for enabling vectorisation of loops with data dependent control flow. An example of high-level program code with a loop containing data dependent operations is shown below:

```
for (int i = 0; i < LEN; i++) {
    if (data[i] >= THRESHOLD) {
        data[i] = 0;
    }
}
```

Hence, there is an array data[ ] of elements of length LEN to be processed, and for each element data[i] of the array, the element is to be compared against a threshold and set to 0 if it is less than the threshold. Wth purely scalar instructions, each element of the array would require several instructions to be executed (one to load the data from memory, one to compare it against the threshold, and another to write a value of 0 back to memory if the data value was less than the threshold).

When this is compiled into assembly code using vector instructions, the following sequence can be provided:

```
    VMOV Q7, #0
    DLSTP.32 LR, R4, loopEnd        // R4 = LEN
loopStart:
    VLDR.32 Q0, [R2]                // R2 = data pointer
    VPT.32 GE, Q0, R0               // R0 = THRESHOLD
    VSTR.32 Q7, [R2], #16           // Lane predication of VSTRS based on VPI
    DLE loopStart
loopEnd:
``` elements with the scalar threshold in register R0, and sets the control information based on the outcomes of each element comparison. The subsequent store instruction VSTR is predicated element-by-element so that it only stores the value #0 to the elements of the array for which the VPT instruction determined the previous data value was greater than or equal to the threshold. Note that by allowing the pointer update for the store instruction VSTR to proceed even if all the lanes are masked by the VPT instruction (as discussed for FIG. 4 above), this enables the data pointer R2 to be incremented so that the next iteration of the loop will access the next chunk of data from the array in memory. Hence, this type of VPT predication is very useful for supporting vectorised loops.

This approach avoids the needs for the store instruction itself to include information in its encoding identifying which predicate information should be used, and avoids the need to provide a bank of dedicated predicate registers which can be referenced by specific vector instructions. Instead, a number of instructions which follow the VPT instruction in the assembly code are simply assumed to be affected by the VPT instruction regardless of their encoding. This also simplifies exception handling by reducing the amount of state to be saved and restored.

Figure 5:
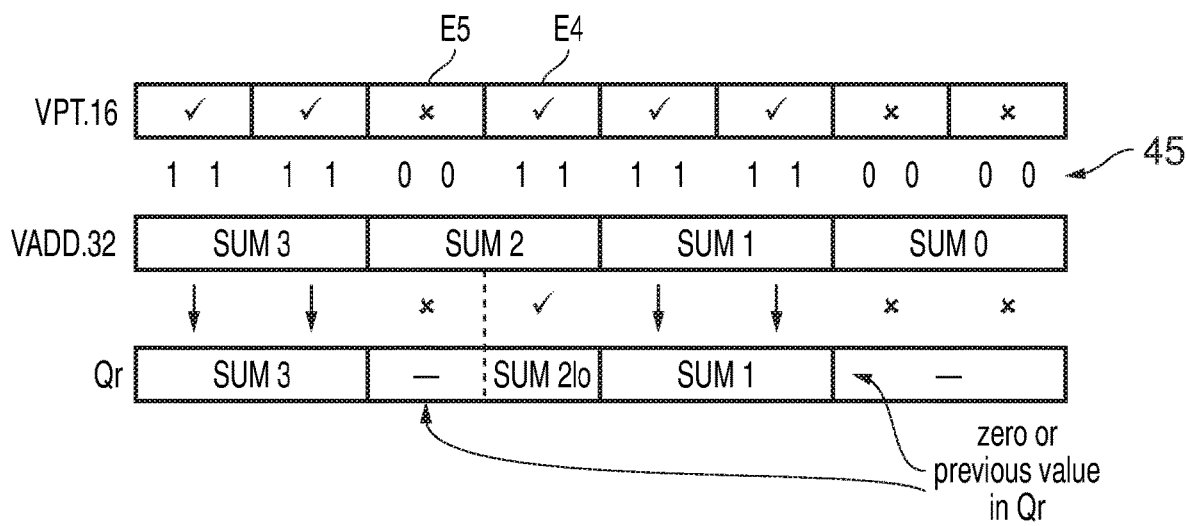
FIGS. 5 to 7 show different examples of masking portions of vector operations for a subsequent vector instruction following execution of a vector predication instruction.
Figure 6:
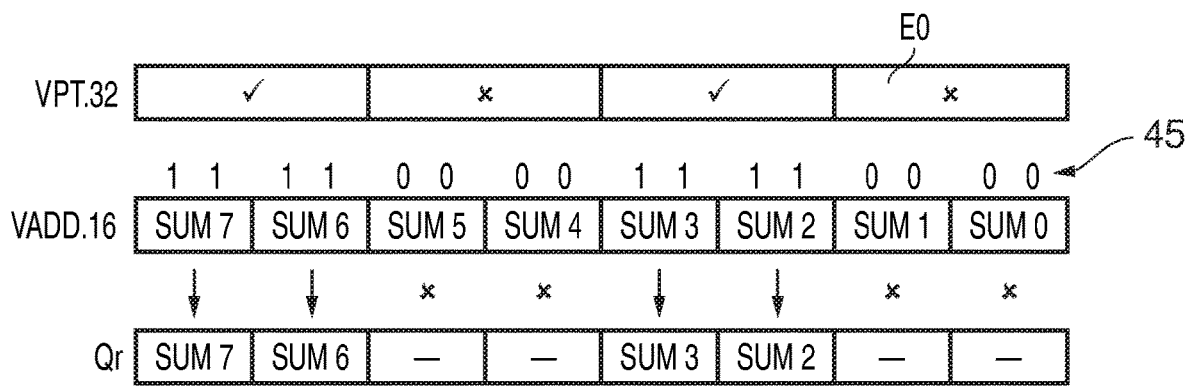
Figure 7:
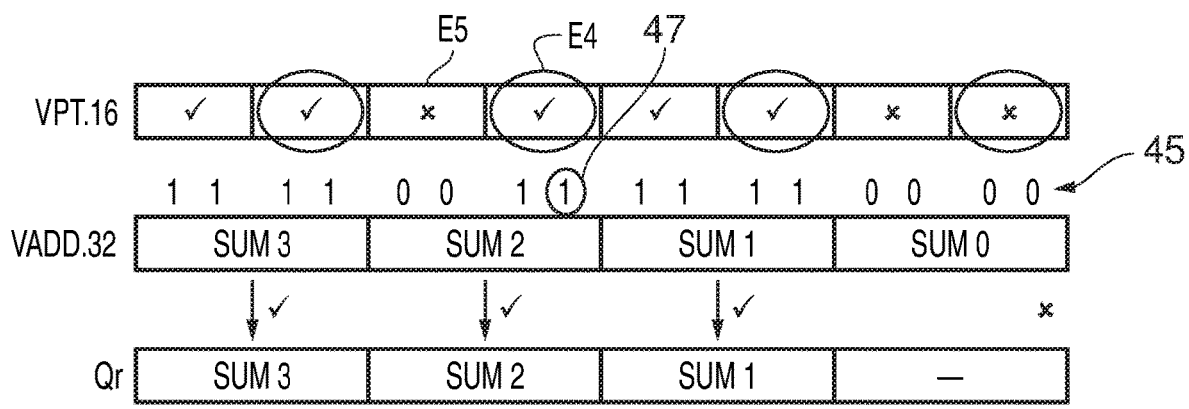

FIGS. 5 to 7 show three further examples of controlling execution of a vector operation by preceding it with a VPT instruction. In the examples of FIGS. 3 and 4 the data element size for the VPT instruction is the same as the data element size for the subsequent vector instruction to be predicated, but this is not essential and FIGS. 5 to 7 show three examples where the element sizes are different. In the example of FIG. 5, the VPT instruction specifies a smaller data element size than the subsequent vector add (VADD) instruction controlled based on the predication. In this case the VPT instruction may lead to control information being set which specifies pass or fail results of the test condition at the granularity of 16-bit elements, but the subsequent vector add instruction being predicated by the VPT instruction may add respective 32-bit elements of two input vectors to provide various sum results sum 0, sum 1, sum 2, sum 3 as shown.

As shown in FIG. 5, in one approach the control information set by the VPT may comprise a series of enable bits 45 (also known as "predicate bits") set for corresponding portions of a vector register, with each enable bit 45 indicating whether the element comparison operation for an element mapping to a corresponding portion of a vector register was passed or failed for the VPT instruction. Hence, the VPT instruction shown in FIG. 5 may result in enable bits equal to '1' being set for the portions corresponding to 16-bit lanes where the test condition was passed, and enable Hence, a loop is executed where each iteration of the loop includes vector instructions for processing multiple elements of the array. The load instruction VLDR loads a block of data values from the array in memory into a vector register Q0. The VPT instruction compares each of these bits of '0' set for the other lanes where the test condition was failed. In this example, the enable bits 45 each correspond to an 8-bit portion of the target vector. Hence, if the data element size for the VPT instruction is greater than 8 bits (e.g. 16 bits in this example), then a block of multiple adjacent enable bits 45 are set to the same value (1 or 0) depending on whether the corresponding element of the target vector passed or failed the test condition.

When executing the subsequent VADD instruction, the writing of a given portion of the destination register Qr is suppressed if the enabled bit corresponding to that portion is 0 in the VPR 22. Hence, if the data element size for VADD instruction is greater than the data element size for the VPT instruction, this can result in only part of the result of a lane of the VADD instruction being written to the destination register Qr (e.g. see lane 2 in FIG. 5 where only the lower portion of the lane's result sum2 is written to the destination register Qr because in the corresponding portion of the vector tested by the VPT instruction, element E4 passed the test condition but element E5 failed). Hence, if the enable bits are only partially set for a given lane due to an element size mismatch, not all of the bits of the lane's result may be output to the destination register.

Alternatively, as shown in FIG. 7, another approach may be for the masking of each lane to be controlled based on one of the enable bits corresponding to that lane, so that lanes can only be masked or not as a whole. For example, in lane 2 the writing of the sum value sum2 to register Qr may depend on the least significant enable bit 47 corresponding to that lane (e.g. in this case lane 2 is not masked because the lowest element E4 in the corresponding part of the VPT instruction's target vector passed its test condition, regardless of whether element E5 failed). This approach may be preferred for some types of vector instruction such as load/store instructions where it may be undesirable or impractical to perform a load/store of only part of a data word.

Some systems may support both the approaches shown in FIGS. 5 and 7 with a programmable parameter set in a control register or in the encoding of the VPT instruction specifying which option should be used. Other hardware embodiments may support one or other of the techniques shown in FIG. 5 or 7. In practice the approach shown in FIG. 5 may be simpler to implement in hardware, since there is then a fixed mapping between a given portion of the vector and the particular enable bit 45 used to control masking of that portion, regardless of the particular data element size used for the subsequent vector instruction.

As shown in FIG. 6, it is also possible for the subsequent vector instruction to have a smaller data element size than the VPT instruction. In this case, all the byte enable bits 45 corresponding to the same data element of the target vector tested in the VPT instruction will be set to the same value, either 1 or 0, and this control groups of smaller data elements in the subsequent vector instruction to be either masked or not masked, depending on the outcome of the corresponding element comparison.

Hence, in summary, there may be a one-to-one, one-to-many or many-to-one mapping between the elements of the VPT instruction and the elements processed in the subsequent vector instruction. It is not essential for an entire lane of processing in the subsequent instruction to be masked, since as shown in FIG. 5 it is also possible to partially suppress only a portion of a given lane when there is a size mismatch in the data elements of the two instructions. In general, for the subsequent vector instruction, the control information controls whether a given portion of a given lane is masked depending on the outcome of the element comparison operation performed for a corresponding element in the target vector subjected to the VPT instruction.

Also, as shown in FIG. 5, there are different options for how to mask the operation in a given portion of a data element. As shown for lane 0, one option is to set the portions of the destination register for which operations are masked to a predetermined value. Alternatively, the masked portions of the destination register could retain their previous values so that the new results of the add instruction in non-masked lanes merge with the old results previously stored in the same destination register for the masked lanes. Hence, in some cases the VPT instruction may specify (through its opcode or a separate control parameter) whether merging or zeroing predication is to be used. Alternatively the instructions being predicated (e.g. the VADD in the examples of FIGS. 5-7) may indicate whether merging or zeroing predication should be applied, again this could be through the opcode or a separate control parameter.

Another option for masking is to disable performing the vector operations for masked portions of the vector altogether, e.g. to suppress the arithmetic operation performed for a given portion of the vector lane.

Figure 8:
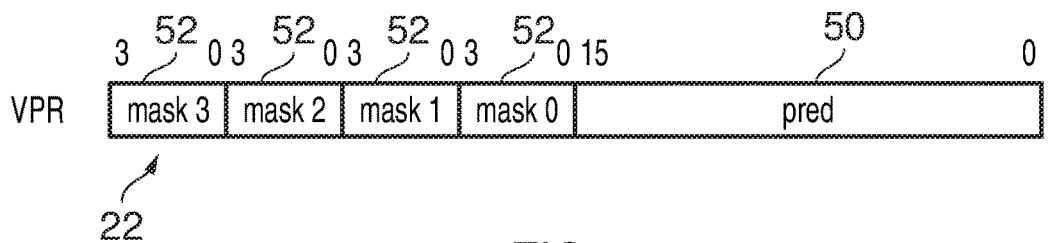
FIG. 8 shows an example of control information set in response to the vector predication instruction for controlling the operation of a predetermined number of subsequent instructions.

FIG. 8 shows an example of control information stored in the VPR 22 in response to a VPT instruction. The VPR 22 includes a predicate field 50 for indicating the outcome of the respective element comparison operations, and one or more mask fields 52 for controlling which subsequent vector instructions are to be processed depending on the predicate field. In this example, there are multiple mask fields 52 for supporting overlapped execution of vector instructions as discussed below, but it would be possible to implement the VPR 22 using only a single mask field 52.

The predicate field 50 can specify the enable bits 45 mentioned above. Each enable bit corresponds to a chunk of a vector register corresponding to the minimum element size supported by the system. For example, if the vector width is 128 bits and the minimum element size supported is 8 bits, the predicate register may include 16 byte enable bits each corresponding to an 8-bit chunk (one byte) of the vector. In examples below, a byte enable bit is set to 1 if the corresponding operation for the corresponding 8-bit chunk of the vector is to be allowed, and set to 0 if the operation is to be masked. It will be appreciated that other systems could flip the interpretation of the enable bit, and mask an operation when the corresponding enable bit is 1.

Note that as it is possible to invert bits of the predicate field 50 for handling of T/E instructions as shown in the examples below, the predicate field 50 does not always explicitly indicate the actual outcome of the element comparisons performed by the VPT instruction (it may indicate the opposite outcome when an E instruction is being processed). In an alternative embodiment, if it is important to retain information identifying the actual outcome of the element comparison operations, then an additional then/else bit could be provided in the VPR 22 for indicating whether enable bits of "1" or "0" should trigger masking of the vector operations for corresponding portions of the vector. This would allow "then" and "else" blocks of instructions following the VPT to be supported without needing to flip the state of the predicate field 50. The then/else bit would then control whether the predicate field 50 are used unchanged or inverted when reading them out from the VPR register to control masking.

The mask fields 52 tracks how many remaining vector instructions are to be masked based on the contents of the predicate field 50. When executing the VPT instruction, each mask field 52 is set to an initial value encoded as shown in the table of FIG. 9. The initial mask value to be used for a given VPT instruction may be specified by the mask field 36 of the VPT instruction itself, or could be derived by some logic circuitry from other information encoded in the VPT instruction. However, it may be simplest to encode the initial mask value in the instruction directly. Different VPT instruction syntaxes VPT, VPTT, VPTE, VPTTTE etc. are used to simplify understanding of which subsequent instructions are to be affected by the VPT instruction, with the pattern of up to four subsequent instructions I0, I1, I2, I3 to be predicated being indicated by the collection of letters T and E at the end of the VPT instruction syntax. Here, "T" represents a "then-condition" instruction for which masking is applied in the portions of the vector corresponding to an element failing its test condition, and "E" represents an "else-condition" instruction for which the masking is applied in the portions of the vector corresponding to an element passing its test condition.

The 4-bit mask value identifies the number of subsequent vector instructions which are to be predicated by the VPT instruction which can be between 1 and 4. The number of subsequent vector instructions to be predicated is represented by the bit position of the least significant '1' bit in the mask value. If the least significant '1' bit is at the most significant bit (0b1000), only one subsequent instruction I0 is predicated. If the least significant '1' bit is at the second most significant bit (0bx100, where x is either 0 or 1), two subsequent instructions I0 and I1 are predicated. If the least significant '1' bit is at the third most significant bit (0bxx10), three subsequent instructions I0, I1, I2 are predicated. If the least significant '1' bit is at the least significant bit position (0bxxx1), all four subsequent instructions I0, I1, I2, I3 are predicated.

The first instruction I0 following the VPT instruction is always treated as a T instruction. In encodings where the number of subsequent vector instructions to be predicated is more than one, the "x" bit values shown above (at bit positions between the least significant "1" bit and the most significant end of the mask value) indicate the pattern of T and E instructions to be predicated. In general, each bit value equal to 1 in this portion of the mask between the least significant 1 bit and the top end of the mask indicates that there is a change in the status from a T instruction to an E instruction, or vice versa. For example, the mask encoding 0b0001 indicates that all four subsequent instructions I0-I3 are T, because there are no '1' bits in the upper three bits and so none of the subsequent instructions change T/E status relative to the preceding instruction. On the other hand, the mask encoding 0b0110 for example represents that the three subsequent instructions I0-I2 are to be predicated as T, T, E respectively, because the first '0' indicates that I1 is the same T/E status as I0 (both T), while the next bit of '1' indicates that I2 will be the opposite T/E status compared to I1, i.e. I2 is an E instruction. Similarly, the other patterns of mask bits can be interpreted in the way shown in FIG. 9.

Figure 10:
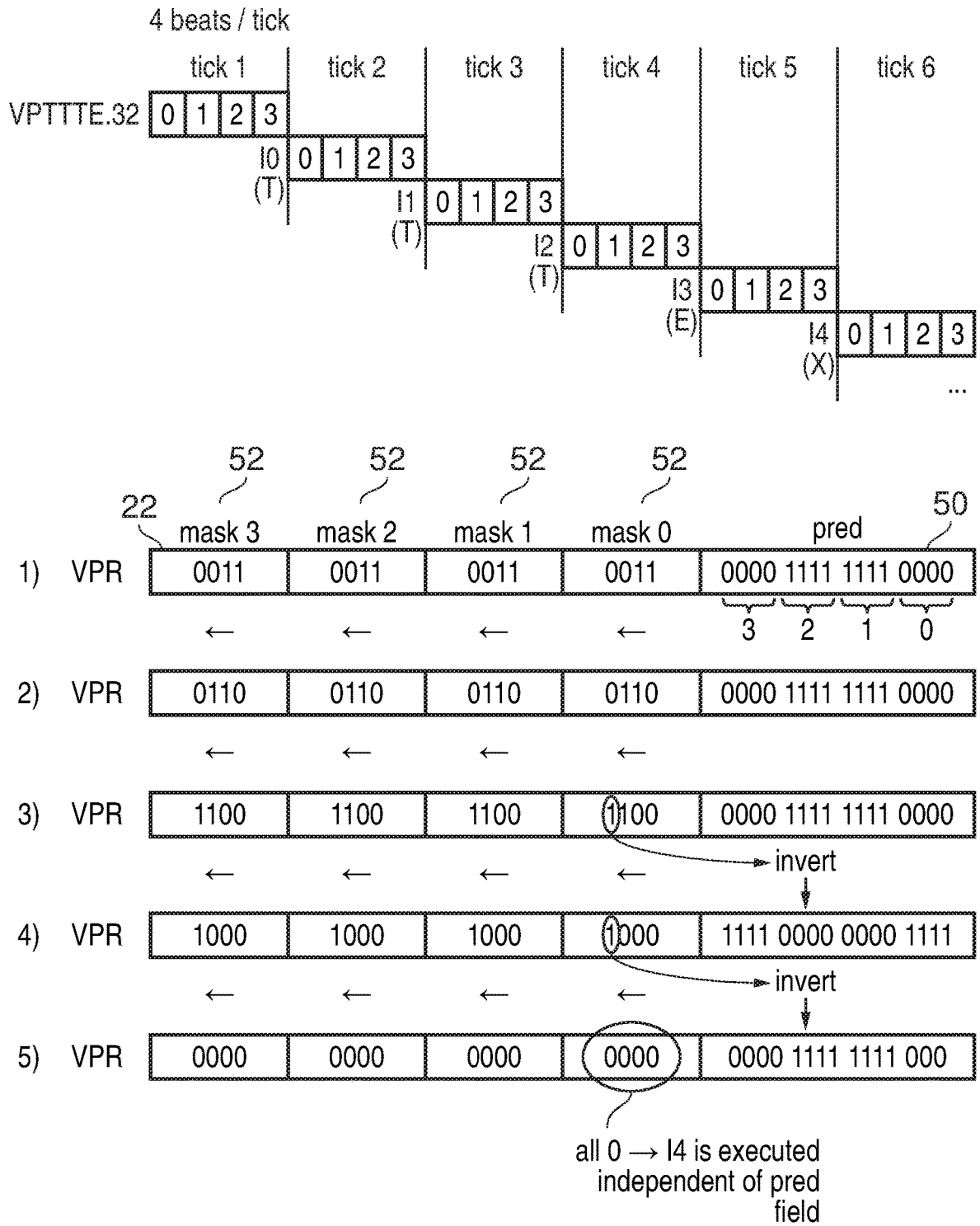
FIGS. 10 to 12 show three examples of using multiple mask fields to support different amounts of overlap between execution of successive vector instructions.
Figure 11:
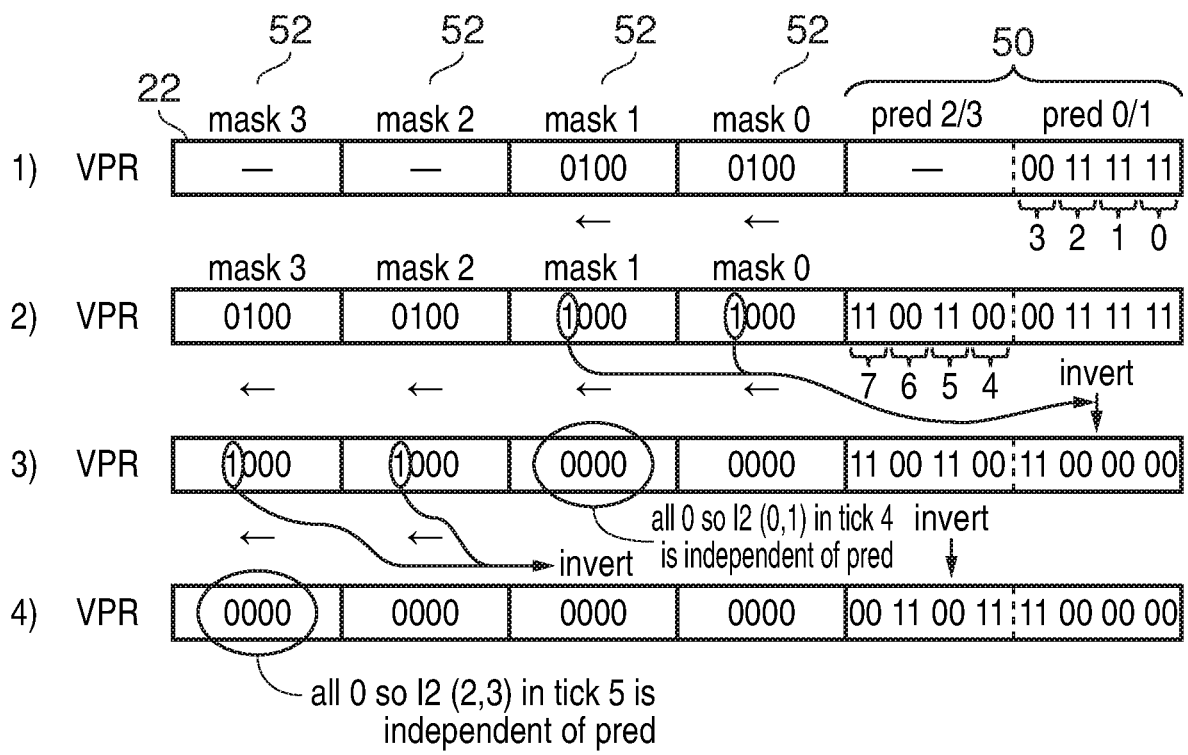
Figure 12:
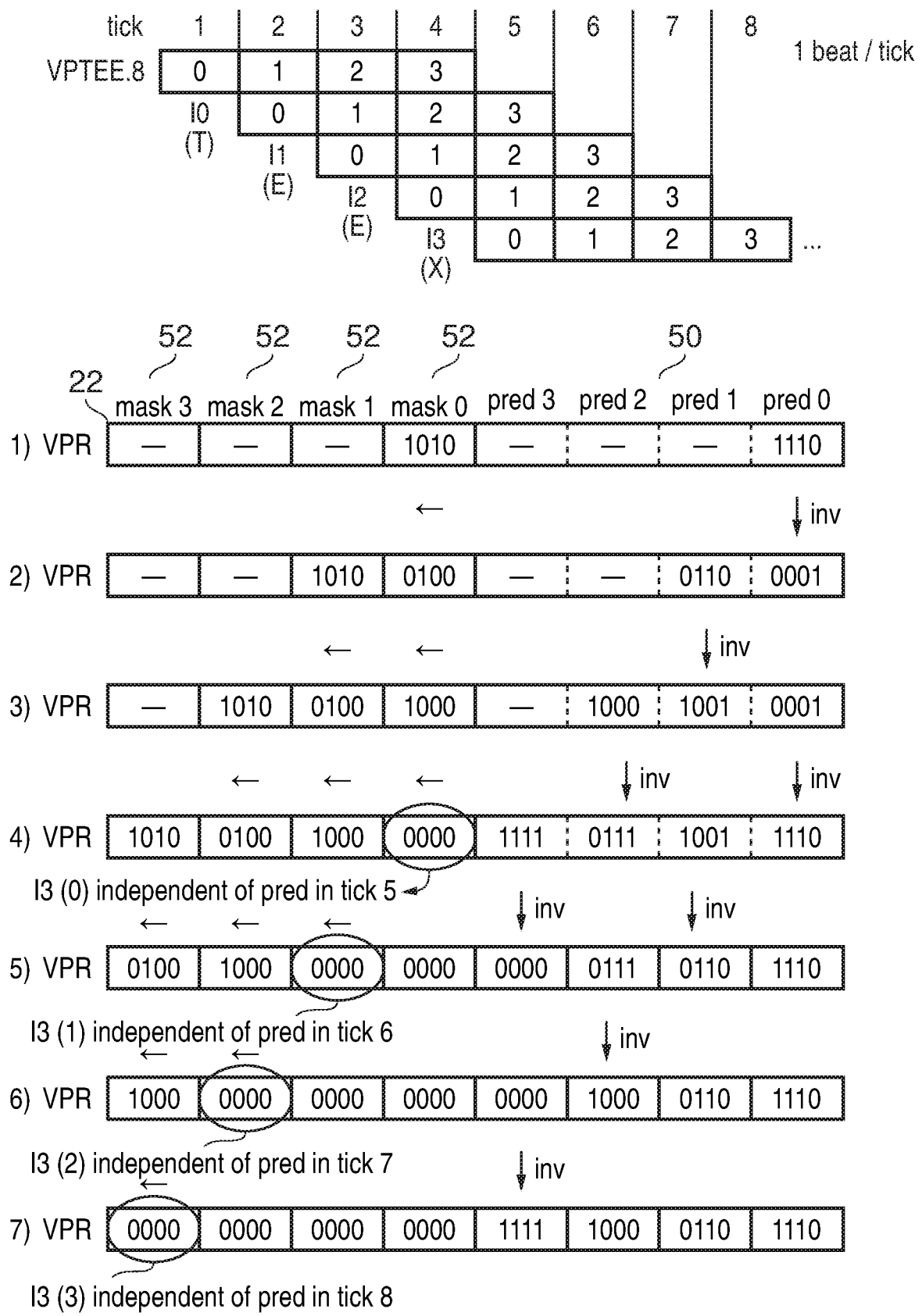

FIGS. 10 to 12 show three examples of how setting the mask value to this initial value enables the subsequent instructions to be processed according to the correct predication result and the desired pattern of T and E instructions.

The execution of a vector instruction is divided into parts referred to as "beats", with each beat corresponding to processing of a section of a vector of a predetermined size. A beat is an atomic part of a vector instruction that is either executed fully or not executed at all, and cannot be partially executed. The size of the section of a vector processed in one beat is defined by the architecture and can be an arbitrary fraction of the vector. In the examples of FIGS. 10 to 12, a beat is defined as the processing corresponding to one quarter of the vector width, so that there are four beats per vector instruction. Clearly, this is just one example and other examples may use different numbers of beats, e.g. two or eight. The section of the vector corresponding to one beat can be the same size, larger or smaller than the data element size of the vector being processed. Hence, even if the element size varies from implementation to implementation or at run time between different instructions, a beat is a certain fixed width of the vector processing. If the section of the vector being processed in one beat includes multiple data elements, carry signals can be disabled at the boundary between respective elements to ensure that each element is processed independently. If the section of the vector processed in one beat corresponds to only part of an element and the hardware is insufficient to calculate several beats in parallel, a carry output generated during one beat of processing may be input as a carry input to a following beat of processing so that the results of the two beats together form a data element.

Different hardware implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known microarchitecture techniques such as pipelining may mean that a single tick may require multiple clock cycles to perform at the hardware level, and indeed that a single clock cycle at the hardware level may process multiple parts of multiple instructions. However such microarchitecture techniques are not visible to the software as a tick is atomic at the architecture level. For conciseness such micro-architecture are ignored during further description of this disclosure.

As shown in FIG. 10, some processing circuits 4 may have sufficient hardware to perform all of the beats of a given vector instruction in parallel so that in each tick, four beats are executed. This means it is not necessary to overlap the execution of different instructions at the architecture level since an entire instruction can be completed in one tick. As shown in FIG. 10, when there is a sequence of vector instructions including a vector predication instruction and a number of subsequent instructions I0 to I4, the processing of one instruction does not start until the previous one has finished.

The lower part of FIG. 10 shows an example of the control information set in the VPR 22 when controlling the sequence of instructions. Rows 1 to 5 show the VPR control information set at the end of ticks 1 to 5 respectively (i.e. the control information used to control the processing of instructions I0 to I4 in ticks 2 to 6 respectively). In this example, the VPT instruction is specified as VPTTTE, so in response to the VPT instruction the mask value 0011 is written to each of the mask fields 52 of the VPR 22, according the encoding shown in FIG. 9. The VPT instruction in this example specifies a data element size of 32 bits, and so each of the beats of processing of the VPT instruction triggers a corresponding element comparison of 32-bit elements (in this example the data element size matches the unit of processing processed in one beat, but this is not essential). Lanes 0 and 3 of the target vector of the VPT instruction fail their test condition, while lanes 1 and 2 pass, and so the predicate field 50 of the VPR 22 is set with the byte enable bits corresponding to lanes 1 and 2 equal to '1' and the byte enable bits corresponding to lanes 0 and 3 equal to '0'.

When processing subsequent vector instructions, if the mask field is non-zero then predication is applied based on the predicate bits in field 50. If the mask field has all bits set to '0', then no predication is applied. Hence, at the end of tick 1 the mask fields have been set to 0011 and so in tick 2 the subsequent vector instruction I0 is predicated based on the byte predicate bits in predicate register 50, and operations associated with the portions of the vector for which the predicate bits are 0 are masked. Instruction I0 is a T instruction, because the masking is being applied in the portions of the vector where the VPT instruction failed the test condition.

On switching from instruction I0 to I1 at the end of tick 2, each of the mask fields is left shifted by one bit position to produce updated mask values as shown in row 2 of FIG. 10. The top bit which is shifted out of the mask field at this point has a bit value of 0, and so the predicate field 50 is not inverted and remains the same, so that instruction I1 is also treated as a T instruction. Again, since the mask fields are non-zero during tick 3, instruction I1 is selectively masked based on the predicate field 50.

Between ticks 3 and 4, on switching from instruction I1 to I2, the mask fields are again left shifted one bit position and again the top bit shifted out of the mask is 0, and so there is no inversion of the predicate field. Hence, instruction I2 is also treated as a T instruction. Row 3 of FIG. 10 shows the VPR values used for instruction I2.

However, on switching from instruction I2 to instruction I3, the left shift of the mask field results in a bit value of 1 being shifted out of the mask, and this triggers inversion of the predicate field 50 so that the '1's and '0's flip values as shown in row 4 of FIG. 10. Row 4 shows the control information used for instruction I3 in tick 5. Since the predicate bits have flipped, I3 is an E instruction because its masking will be applied in the portions of the vector where the original VPT instruction passed the test condition, and this time the portions of the vector for which the original VPT instruction failed its test condition will not be masked. This is consistent with the designation of instructions I1-I3 as TTE as specified by the original VPT instruction.

Finally on switching from instruction I3 to I4 at the end of tick 5, a left shift is again applied to each mask field and this results in the final '1' bit of the mask being shifted out, so that the mask values now become all 0. This means that the following instruction I4 to be processed in tick 6 is processed independent of the of the contents of the predicate field 50, so that it is not conditional on the outcome of the VPT instruction. Hence, we can see that by setting the mask value to a value in which the least significant '1' bit is positioned so that it will be shifted out of the mask after a predetermined number of subsequent instructions, this controls how many instructions are affected by the predicate values set up in response to the VPT instruction. In this case, the '1' was placed at the least significant bit of the mask and so it took four subsequent shifts to shift it out, so this means that four subsequent instructions I0 to I3 are predicated by the VPT instruction.

Note that, as the top mask field shifted out at the end of tick 5 is a '1', another inversion is applied to flip the bits in the predicate field 50 ready for tick 6, even though as the mask becomes all 0, the predicate bits will not affect the outcome of instruction I4 anyway. Firstly, this makes the hardware simpler since the bits of the predicate field can simply be inverted when the top bit shifted out is 1 (there is no need for additional circuitry for detecting the special case when the mask field becomes all 0 and suppressing the inversion in this case). Also, inverting the predicate bits at the end of a VPT block of instructions can be useful for setting the predicate bits 50 to values which can subsequently be used by an "AND" form of the VPT instruction to evaluate more complex combinations of test conditions, as will be discussed below with respect to FIG. 13.

FIG. 10 shows an example where each of the mask fields 52 are set to identical values and read when processing the appropriate beats of each vector instruction. An alternative approach when there is no overlap between execution of different vector instructions would be for the VPT instruction to only write to one of the mask fields (e.g. mask field 0) and for each of the beats of vector processing to refer to the same mask field when predicating the subsequent instructions. If the processor only supported the non-overlapped execution of the form shown in FIG. 10, then it would be enough to provide only a single mask field. Alternatively another approach in such a case would be to only implement the data storage associated with a single mask field (MASK0), but replicate the value of that mask field to all the other mask fields. This approach would provide a consistent view of the processing circuitry to software, regardless of whether instructions were overlapped or not. If the processor implemented such a replication scheme it would typically ignore writes to the replica mask fields MASK1 to MASK3.

However, in smaller, more energy-efficient, processors there may not be enough hardware resource to process all of the beats of a given vector instruction in parallel. For example, the width of the vector processing units could be narrower, e.g. half the width of the overall vector register, and in this case processing of a given vector instruction would require two ticks of the architectural clock, one to process the first two beats and another to process the second two beats as shown in FIG. 11. While it would be possible in such a case to still execute the vector instructions without any overlap, so that a second instruction starts once the first is completed, this can lead to inefficient use of the hardware resources available. It is relatively common in applications using vector instructions for there to be a relatively even mix of different types of vector instructions, such as load/store instructions interacting with the memory system 8 on the one hand and arithmetic instructions such as multiplies on the other hand. If processing alternates between load/store instructions and multiply instructions, executing the instructions without overlap can lead to relatively long periods when one of the relatively expensive hardware blocks (such as a multiply accumulate unit or a load/store unit) remain unused, which reduces performance and consumes more power.

As shown in FIG. 11, a more efficient use of the resources can be achieved if processing can overlap the execution of different vector instructions, so that a first subset of beats of a second vector instruction is performed in parallel with a second subset of beats of a first instruction. In the example of FIG. 11, beats 0 and 1 of instruction I0 are executed in parallel with beats 2 and 3 of the VPT instruction, and instructions I0/I1 and I1/I2 are overlapped in a similar way. While this overlapped execution may not always be possible (e.g. there may be dependencies between the instructions, or if two consecutive instructions require the same hardware unit then the second one may need to wait for the first to complete), in many cases vector instructions using different hardware units may not have any dependencies between different lanes, since many vector operations stay largely within the same lane. For example, while lane 0 of a given vector instruction I1 may depend on the outcome of lane 0 of the preceding instruction I0, it is unlikely that lane 0 of I1 will depend on lanes 1, 2, 3 of I0, and so lane 0 of I1 can start once lane 0 of I0 is complete (and similarly for other pairs of consecutive vector instructions). By overlapping the execution of some beats of the instructions in the way shown in FIG. 11, the percentage utilisation of a given hardware unit can be improved to increase processing performance. This can also help to save power by reducing the time for which relatively expensive hardware blocks such as multiply accumulate units have to remain active.

FIG. 11 shows an example of setting the control information in the VPR 22 for a VPT instruction, when execution is overlapped in this way. Rows 1 to 4 of FIG. 11 show the contents of the VPR set at the end of ticks 1 to 4 respectively (i.e. the VPR contents for controlling the operation of beats of processing in ticks 2 to 5 respectively). Mask fields 0 and 1 are set/read during beats 0 and 1 of a given instruction, and mask fields 2 and 3 are set/read during beats 2 and 3 of a given instruction. Similarly, the predicate field is effectively divided into corresponding to beats zero and one or two and three respectively.

In tick 1, beats 0 and 1 of the VPT instruction are executed. This time the VPT instruction is specified as VPTT indicating that two subsequent instructions following the VPT instruction are to be predicated and they are both to be treated as then instructions (T). Hence, beats 0/1 of the VPT instruction control writing of the mask value 0100 to mask fields 0/1 according to the encoding of FIG. 9. Mask fields 2 and 3 retain their previous values, which will typically be 0000 if there has not been a recent VPT instruction. This time, the element size is 16-bit bits, i.e. half of one beat, and so beats 0 and 1 together perform four element comparison operations on 16-bit elements, and the results of these element comparisons are written to the lower half of the predicate field 50. Since the predicate bits are specified at a granularity of 8-bit chunks of the vector, there are two bits per 16-bit element comparison operation and so pairs of bits are set to 0 or 1 depending on the outcomes of the comparisons in each element.

In tick 2, the first two beats of vector instruction I0 are controlled based on the predicate values in the lower chunk of the predicate field 50 because the mask fields 0 and 1 are non-zero. I0 is a T instruction since there has been no flipping of the lower half of the predicate filed since it was set by the VPT instruction. Also during tick 2, beats 2 and 3 of the VPT instruction are also executed, and this results in further element comparisons being performed on the upper four 16-bit elements of the target vector. The processing circuitry 4 sets the upper half of the predicate field to specify byte predication bits indicating the results of each element comparison. Again, since the VPT instruction is specified as VPTT, the initial mask value is set to 0100 in mask fields 2 and 3. Because the VPT instruction has written to mask fields 2 and 3 during tick 2 these mask fields are not left shifted at the end of tick 2. However at the end of tick 2, mask fields 0, 1 are left shifted by one bit position to generate the masks for controlling beats 0 and 1 of the subsequent instruction I1 (because the VPT instruction did not update these fields in this tick). The bits shifted out of mask fields 0, 1 at this stage are equal to 0 and so there is no inversion of the lower half of the predicate field. Hence, at the start of tick 3 the VPR 22 is as shown in row 2 of FIG. 11.

In tick 3, all the mask fields are non-zero. Beats 0 and 1 of instruction I1 are controlled based on mask fields 0 and 1 and predicated based on the lower half of predicate field 50, and beats 2 and 3 of instruction I0 are controlled based on mask fields 2 and 3 and predicated based on the upper half of the predicate field 50.

At the end of tick 3, all of the mask fields are left shifted by one bit position. For mask fields 2/3 this results in the same shift that happened for mask fields 0/1 at the end of tick 2, and again the bit shifted out is zero and so there is no flipping of the upper half of the predicate field 50. However, for mask fields 0/1, the left shift shifts now results in the last '1' bit value being shifted out of the mask field and these mask fields become all-zero, which means that during tick 4 beats 0 and 1 of instruction I2 will be executed independently of the predicate. This is the correct processing since the VPTT instruction should only affect the next two vector instructions, and so I2 should not be dependent on the predicate. As the top bit shifted out of mask fields 0 and 1 is '1', the lower half of the predicate field 50 is inverted on transitioning between ticks 3 and 4. However, mask fields 2 and 3 are still non-zero in tick 4 (see row 3 of FIG. 11), and so beats 2 and 3 of instruction I1 executed during tick 4 will still be dependent on the top half of the predicate field 50.

Finally, at the end of tick 4 another left shift is applied to each mask field, and this results in the mask fields 2/3 also becoming all zero, so that beats 2 and 3 of instruction I2 are executed independently of the predicate values 50 during tick 5. Again, since the top bit shifted out of mask fields 2 and 3 is '1', the upper half of the predicate field 50 is inverted on transitioning between ticks 4 and 5.

In summary the processing of each beat of subsequent vector instructions is independently controlled by the mask field and portions of the predicate field that correspond to the beat of the vector instruction being performed. Similarly whether a portion of the predicate field is inverted at the end of a tick is dependent on whether the bit shifted out of the mask field corresponding to that portion is a 1 or a 0.

FIG. 12 shows another example in which a greater degree of overlap is performed between successive instructions. The processing circuitry 4 may have processing hardware which only supports one beat of processing per tick, and so processing of a given vector instruction may need to be spread over four ticks. In this case to maintain higher utilisation of hardware units, where possible different vector instructions can be staggered in their execution so that beat 0 of a second instruction starts in parallel with beat 1 of the preceding instruction as shown in the diagram at the top of FIG. 12.

In this case, beats 0-3 for a given instruction each set or read from a corresponding one of the mask fields 0-3, and the predicate field 50 is also subdivided into quarters with each quarter being set following a corresponding beat of processing of the VPT instruction. Rows 1 to 7 of FIG. 12 show the contents of the VPR 22 at the end of ticks 1 to 7 respectively (i.e. the control information for controlling the beats of processing executed in ticks 2 to 8 respectively). This time the VPT instruction is specified as VPTEE, and the data element size is 8 bits, and so each beat corresponds to four elements and each byte predicate bit of the predicate field 50 is set independently from the other bits depending on the outcome of the element comparison for a corresponding 8-bit element of the target vector specified by the VPT instruction.

In tick 1, beat 0 of the VPT instruction is executed and mask field 0 is set to 1010 to indicate a VPTEE instruction. Predicate bits are written to the lower quarter of the predicate field 50 depending on the outcomes of the corresponding element comparisons.

In tick 2, the VPR contents shown in row 1 of FIG. 12 are used for processing of beat zero of instruction I0 so that it is predicated based on the predicate bits in the lower quarter of the predicate field 50. Also in tick 2, beat 1 of the VPT instruction is executed and it writes the initial value 1010 to mask field 1 and updates the predicate bits in second quarter of the predicate field based on the outcome of the corresponding element comparisons. At the end of tick 2 there is a left shift of mask field 0, and as the top bit of the mask field shifted out is '1', there is an inversion of the lower quarter of the predicate field so that at the start of tick 3, the contents of the VPR 22 are as shown in row 2 of FIG. 12. Since the lower quarter of the predicate field was flipped, this means that during tick 3, beat 0 of instruction I1 represents an "else" instruction since its operation will be masked in the portions of the vector which correspond to portions for which the test condition was passed by the VPT instruction.

Similarly, as shown in the remaining rows of FIG. 12, as different beats of the VPT instruction are executed, the corresponding portions of the predicate field 50 are populated based on the outcomes of the corresponding element comparisons and each successive mask field is set to the initial value in successive ticks. At the end of each tick, all the mask fields are left shifted one bit position, and there is an inversion of the corresponding portion of predicate field for any mask field where the bit shifted out is equal to '1'. Eventually, each mask field becomes all-zero, once all the '1' bits have been shifted out, and this is staggered for the different mask fields so that a given mask field will become all-zero in time for the tick in which the corresponding beat of instruction I3 is to be processed (since I3 is the first instruction to be processed independently of the predicate). Similarly, the inversion of the respective quarters of the predicate field is staggered to match the staggered execution of the corresponding TEE instructions I0, I1, I2.

In summary, by providing multiple mask fields, this gives the flexibility for microarchitecture designers to implement different hardware designs depending on the power budget and circuit area available and the trade off between performance and energy efficiency desired for a given application. High performance systems can use the approach of FIG. 10 to allow all the beats to be processed in parallel while lower power systems may use the approach in FIG. 11 or 12. By defining multiple mask fields in the architecture, this avoids constraining what particular form of execution resources should be provided which enables the architecture to be used across a range of power and performance points.

While FIGS. 9 to 12 show a mask field encoding which uses the bit position of the least significant '1' bit to indicate the number of remaining instructions to be predicated by the VPT instruction, and left shifts the mask field each time another instruction is processed, in other embodiments the mask field could be encoded the opposite way round, with the most significant bit set to '1' representing the number of remaining instructions and a right shift being applied in response to each subsequent instructions. Also, rather than using the '1' bits to identify the number of instructions to be predicated, and triggering inversion of the predicate field 50 when a '1' is shifted out, this could be done using bits equal to '0'. Hence, more generally the predetermined number of instructions to be predicated by the VPT instruction may be represented by the bit position of the furthest bit from a given end of the mask field which has a predetermined bit value (where the predetermined bit value is either '0' or '1'), and in response to each subsequent vector instruction the mask field can be shifted towards the given end by one bit position. If the bit shifted out has the predetermined bit value, then at least a portion of the predicate field corresponding to that mask field is inverted.

Also, it is not essential to represent the number of remaining vector instructions to be predicated using the bit position of the least/most significant bit equal to 1 or 0. While this technique is useful because it enables the pattern of T/E instructions to be encoded relatively efficiently using the remaining bits of the mask field, other techniques could be used to indicate how to process the subsequent vector instructions. For example, the mask field 50 could simply specify a binary numeric value indicating the number of remaining vector instructions to be predicated, which is set to the predetermined number in response to the VPT instruction, and then decremented following each subsequent instruction until it reaches zero, at which point the next vector instruction would be processed independently from the predicate field 50. The pattern of T/E instructions could be indicated by a separate field from the value indicating the number of remaining instructions to be predicated, rather than using a single encoded value as shown in FIG. 9.

The contents of the VPR 22 may be saved to a stack when an exception event occurs, and following handling of the exception, the saved VPR value may be restored from the stack to the VPR so that processing can resume from the point at which it was interrupted by the exception. This avoids the need to repeat processing of the VPT instruction following return from the exception.

The examples shown in FIGS. 10 to 12 show cases where each of the following instructions subsequent to the VPT instruction are vector instructions. However, sometimes one of the following instructions could be a scalar instruction or some other kind of non-vector instruction. In this case, the scalar or non-vector instruction may operate independently of the contents of the VPR so that its functionality is performed regardless of the vector predication. Nevertheless, execution of a scalar instruction may still trigger the mask fields of the VPR 22 to be shifted, to count down one more remaining instruction to be processed. Hence, while the VPT instruction specifies a predetermined number of subsequent instruction slots to be predicated if they are vector instructions, not all the slots may actually be vector instructions. Alternatively, it would also be possible not to shift the mask registers when encountering a non-vector instruction, in which case the number of vector instructions actually affected by the VPT instruction will not depend on whether there are any intervening non-vector instructions.

Also, sometimes a programmer or compiler may follow one VPT instruction with another VPT instruction within the block of subsequent instructions which would be predicated by the first VPT instruction. In this case, the second VPT instruction may reset the corresponding mask fields of the VPR 22 to the initial mask value, effectively restarting counting of the number of remaining instructions in the VPT block. Hence, including a second vector predication instruction may also break the VPT block and stop the full number of instructions being predicated by the earlier VPT instruction. In practice, if the programmer or compiler intends to include a second VPT instruction shortly after a first, then they would normally encode the first VPT instruction so that its VPT block ends before the second one appears, e.g. by selecting the mask initial value so that there are fewer instructions subsequent to be predicated.

The instruction decoder can support several variants of the VPT instruction as follows:

VPT: the basic VPT instruction discussed above, which controls the processing circuitry 4 to set the control information in the VPR 22 depending on an outcome of the element comparison operations performed on the target vector, independent of any previous predicate outcome indicated by the control information. Hence, the VPT instruction resets the predicate field 50 to the enable bit values 45 determined from the corresponding element comparison operations. The VPT instruction also sets the mask fields 52 in the way discussed above to control which subsequent vector instructions are controlled in dependence on the predicate field 50.

VPTA: an AND form of the VPT instruction, for which the enable bits 45 resulting from the element comparison operations performed in response to the VPT instruction are ANDed with the corresponding bits in the predicate field 50 and the result written to the predicate field 50. The mask fields 52 are set in the same way as for the VPT instruction. Hence, when one of the subsequent vector instructions is executed following a VPTA instruction, the masking of vector operations depends not only on the comparisons performed by the VPTA instruction, but also on the outcome of previous comparisons used to set the predicate field 50.

VCMP: a compare instruction which triggers a number of element comparison operations on a target vector and sets the predicate field 50 to indicate the outcome of the comparisons (independent of any previous predicate outcome indicated by the control information), but which either does not set the mask fields 52 or sets the mask fields 52 to all zeros and so does not lead to subsequent vector instructions being controlled in dependence on the predicate.

VCMPA: an AND form of the VCMP instruction, for which the enable bits 45 resulting from the element comparison operations performed on the target vector are ANDed with the corresponding bits previously indicated by the predicate field 50, and the results of the ANDs written to the predicate field 50 (similar to the VPTA instruction), but which either does not set the mask fields 52 or sets the mask fields 52 to all zeros so does not cause subsequent vector instructions to be controlled in dependence on the predicate.

Unless otherwise stated, references to the VPT instruction in the description above also apply to VPTA. The VCMP and VCMPA instructions shown above produce a single Boolean result per comparison indicating whether the test condition is failed, rather than a multi-bit condition code indicating a condition status from which a range of condition states could be determined. Where the width of the element comparisons performed by a VCMP or VCMPA is larger than a single byte it will be understood that the single Boolean result produced per comparison may be stored in multiple byte predicate bits with the same value within the predicate field 50. Whether a VCMP instruction leaves the mask fields 52 alone, or clears them to all zeros, can be fixed in hardware for some implementations, or could be selected in dependence on a parameter specified by the VCMP instruction. In some embodiments the VCMP and VCMPA instructions may be implemented as VPT and VPTA instructions respectively with the mask field set to zero such that the predetermined number of subsequent instruction predicated is zero (hence there is no need for a separate opcode for indicating the VCMP and VCMPA instructions).

By supporting these instruction variants, this allows more complex logical conditions which cannot be evaluated by a single instruction to be built up using a sequence of instructions. For example:

High-level code:

```
for (int i = 0; 1 < LEN; i++) {
    if ((data[i] < THRESHOLD) && (data[i] > -THRESHOLD)) {
        data[i] = 0;
    }
}
```

Assembly code:

```
VMOV Q7, #0
RSB R1, R0, #0            // R0 = THRESHOLD, R1 = -THRESHOLD
DLSTP.16 LR, R4, loopEnd  // R4 = LEN
loopStart:
    VLDR.16 Q0, [R2], #2      // R2 = data pointer
    VCMP.16 LT, Q0, R0
    VPTA.16 GT, Q0, R1        // GT comparison combined with LT comparison above
    VSTR.16 Q7, [R2]!, #2     // Lane predication of VSTRS based on VPI above
    DLE loopStart
loopEnd:
```

Figure 13:
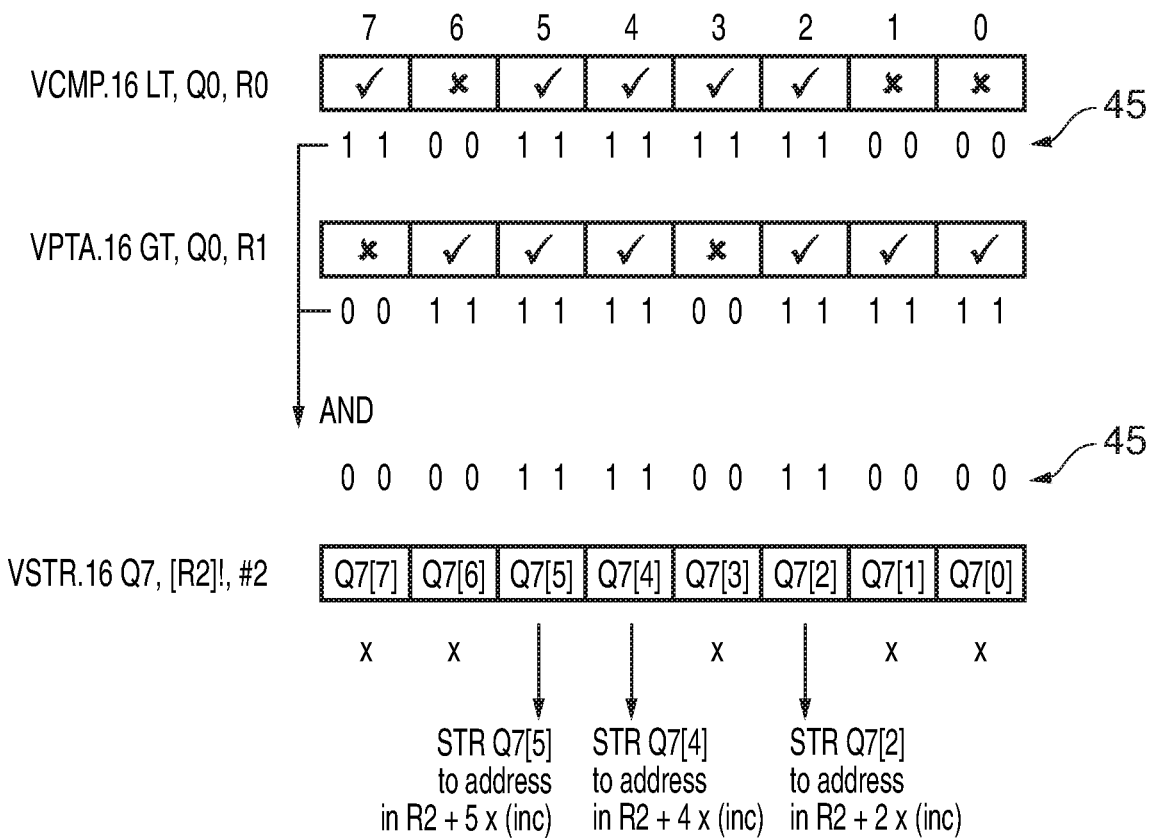
FIG. 13 shows an example of predication based on evaluation of a more complex condition involving multiple comparisons.

FIG. 13 shows an example of setting the byte predicate bits 45 in response to the VCMP and VPTA instructions for controlling the operation of the subsequent VSTR instruction. Hence, in this example the VCMP instruction compares each data element of target vector Q0 against scalar threshold R0 using the LT condition (corresponding to "data[i] <THRESHOLD" in the high level code), and sets predicate bits 45 in the predicate field 50 of the VPR 22 to indicate the results of this comparison. The subsequent VPTA instruction ANDs these enable bits with the results of the corresponding comparisons of elements of target vector Q0 with register R1 based on the GT condition (corresponding to "data[i]>-THRESHOLD" in the high level code), so that the end result is that the enable bits are 1 for those elements for which both of these criteria are satisfied (in this example elements 2, 4 and 5 of the vector Q0). The subsequent store instruction VSTR then masks the store operations associated with lanes for which the enable bits are 0. In this example, the store instruction is a contiguous vector store instruction, where the addresses for each non-masked store operation are calculated by adding the base address in register R2 to n times an increment value (inc), where n is the data element position of the relevant lane (e.g. the store in lane 2 stores to R2+2*inc). It will be appreciated that other examples could use a non-contiguous (scatter) store instruction where each non-masked store operation uses a target address determined based on a corresponding element of an address vector specified in one of the vector registers.

While AND-forms of the VPT and VCMP instructions are discussed above, it would also be possible to define other types of instructions for which the control information is set to indicate a predicate outcome for a given data element of the target vector value which depends on an outcome of a corresponding one of said plurality of element comparison operations and a previous predicate outcome indicated by said control information. For example, the previous predicate outcome and the predicate outcome for the new element comparison could be combined by other logical operations such as OR, NAND, XOR, etc.

As mentioned above, when the technique shown in FIGS. 10 to 12 is used with the bits of the relevant portion of the predicate field 50 being inverted when the top bit shifted out of the corresponding mask field 52 is '1', this results in the predicate bits being inverted when the end of the VPT block is reached (because the final '1' bit of the mask is being shifted out to leave the mask field as all 0 for the next tick). While it may seem pointless to invert the predicate bits when the following instruction is not being predicated, this can be useful for setting up appropriate predicate conditions for a subsequent VPTA or VCMPA instruction. For example, consider the instructions:

VPTA AL, Qa, Qb
VNOP.

The VPTA instruction combines its results with the previous values of the predicate flags, by ANDing with them. This will not actually change the predicate values because, the test condition is specified as AL (always satisfied), so the previous predicate flags are all ANDed with The VNOP instruction is the only instruction in the VPT block and is a no-op (no operation) instruction which would not normally trigger any change to the data register state. However, since the hardware inverts the predicate bits 50 when the most significant bit shifted out of the mask is 1, the effect of the VPTA and VNOP instructions is to invert the predicate conditions in VPR 22 without any other side effects. Hence, this provides a way of evaluating a "NOT" logical operation on the predicate field of the VPR 22. De Morgan's law allows any "OR" based condition to be expressed in terms of a combination of AND and NOT, so this inverting behaviour at the end of a VPT block together with the provision of the AND-form VPTA and VCMPA instructions means that any complex chain of conditions can be evaluated to control predication of a subsequent block of instructions.

In the examples above, the VPT/VPTA instructions control the processing circuitry 4 to perform the element comparison operations on respective elements of the target vector. However, this is not essential and in some implementations the vector predication instruction could set the control information for controlling processing of a predetermined number of subsequent vector instructions based on the comparisons performed by an earlier instruction (such as the VCMP or VCMPA instructions discussed above). Hence, it is not essential for the element comparison operations to be carried out in response to the vector predication instruction itself. However, in practice, performing both the element comparisons and the setting of the control information for controlling the subsequent vector instructions in response to a single instruction is more efficient as it reduces the number of instructions which need to be executed, reducing the overhead in storing a program in memory, caching the instructions to be executed, fetching and decoding the instructions.

Figure 14:
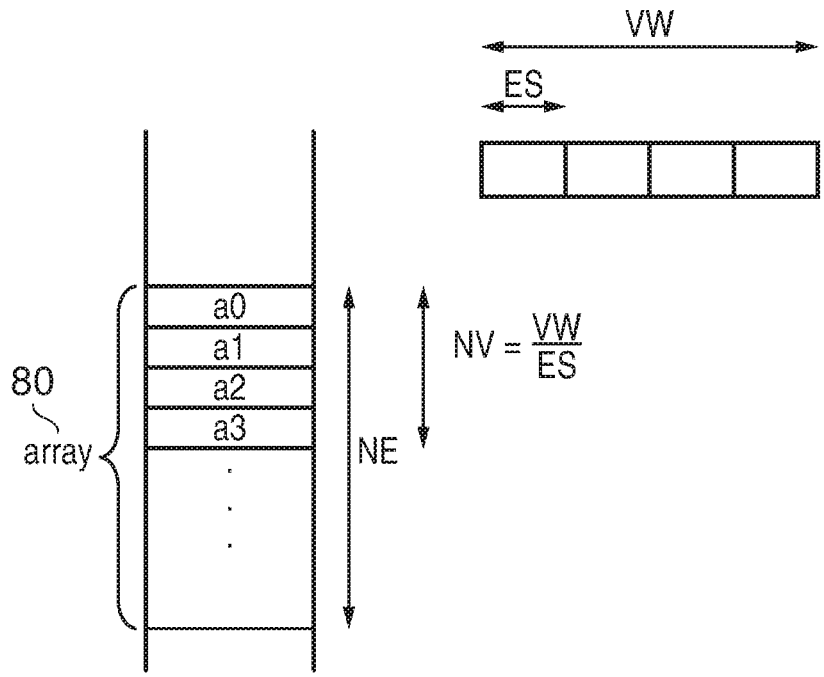
FIG. 14 shows an example of masking lanes of vector processing in dependence on the number of data elements to be processed in a loop of vector instructions.
Figure 14:
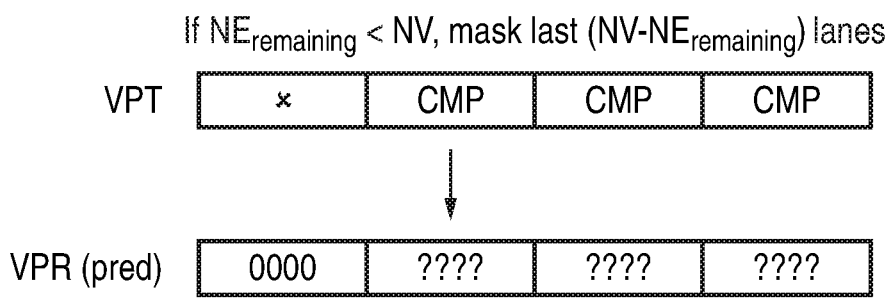
Figure 14:
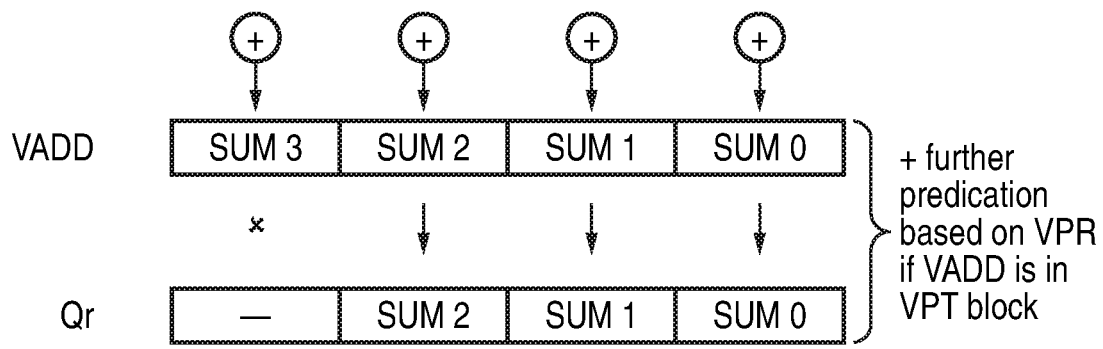

As shown in FIG. 14, the predication applied following a VPT instruction may not be the only form of predication being used. As mentioned above, a common use for vector instructions is in vectorised loops where a certain sequence of operations needs to be applied to each element a0, a1, etc. of an array 80 stored in memory. A loop iterating once per element in the high level code is compiled into vectorised code comprising a loop with fewer iterations, each of which loads a block of elements into a vector register, processes the elements using a series of vector instructions, and stores the results of each lane of processing back to memory. Hence, each iteration may process a block of elements corresponding to the number of data elements in one vector register. If the total number of elements in the array to be processed is NE, and the number of data elements in one vector NV (equal to the vector width VW divided by the data element size ES), then the entire array can be processed in a minimum of NE/NV iterations. However, often the total number of elements NE may not be an exact multiple of the number of elements NV in one vector, and so in the last iteration of the loop, not all of the elements of the vector will be filled with real values to be processed. If the processing in unfilled lanes is allowed to proceed unmasked, this can cause errors. For example, the memory address space beyond the end of the array 80 may not have been mapped in page tables, so there could be a memory access fault or corruption of data adjacent to the array if a load/store operation is performed for one of the "unused" lanes in the final iteration processing the tail of the array.

Therefore, it can be desirable to mask the operations in the unused lanes in the final iteration of the loop. As shown in FIG. 1, the processing circuitry 4 may be provided with loop predication circuitry 90 for controlling which lanes of a given vectorised loop are enabled or masked. On starting a vectorised loop, the loop counter 16 is set to a value specifying the total number of elements NE to be processed in the loop. For example, a loop start instruction may specify the number of elements (e.g. see the loop start instruction DLSTP in the example above which refers to register R4 storing the array length LEN). At the end of each iteration of the loop, the number of elements in one vector NV is subtracted from the loop counter 16, to calculate $NE_{rem}$ the number of remaining elements to be processed. On starting a given loop iteration, if $NE_{rem}<NV$, then the loop predication circuitry 90 controls the processing circuitry 4 to mask operations associated with the upper $NV-NE_{rem}$ lanes of vector processing, e.g. by suppressing the lanes of vector processing themselves (e.g. preventing load/store requests being issued) and/or disabling writing of results of processing in the masked lanes.

If a VPT or VPTA instruction is executed in an iteration when the loop predication circuitry 90 has determined that some lanes should be masked, then those lanes are masked for the subsequent vector instructions following the VPT instruction, regardless of the outcome of the VPT instruction. For example, the control signals provided by the loop predication circuitry 90 may be ANDed with any masking control signals resulting from the predicate enable bits in the VPR 22, to determine overall whether particular lanes should be masked. On the other hand, for the other lanes not required to be masked by the loop predication circuitry 90, the predicate bits set by the VPT/VPTA instruction control whether operations associated with portions of those lanes are masked in the same way as discussed above.

Figure 15:
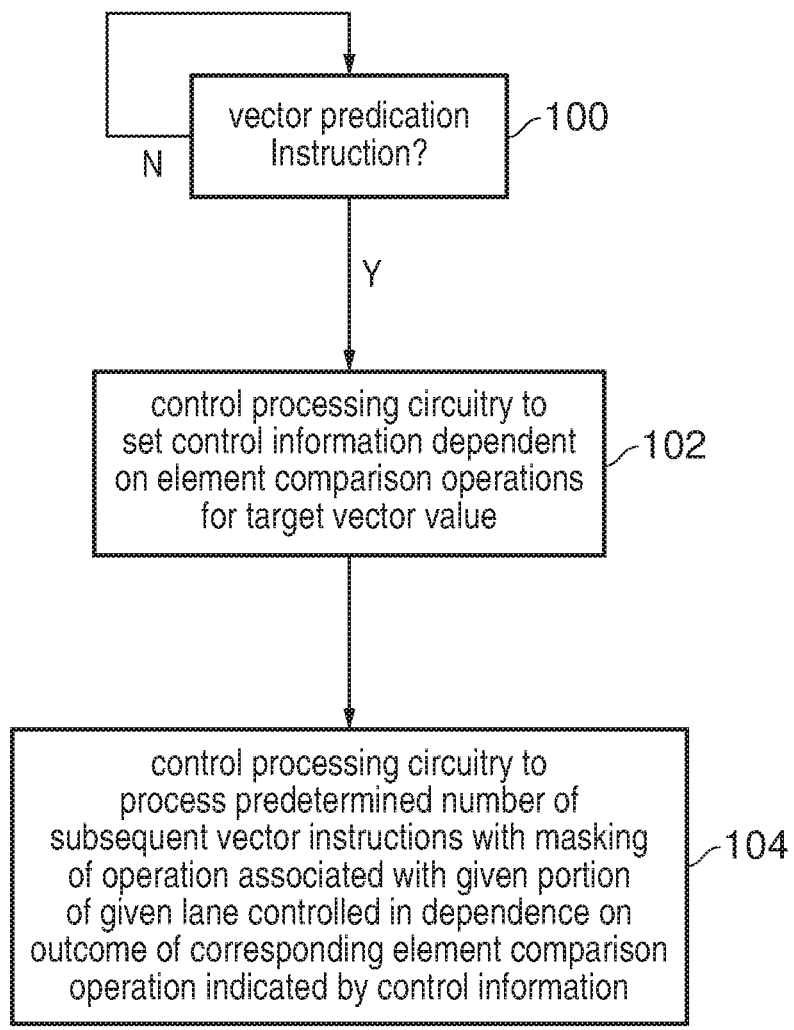
FIG. 15 shows a method of processing a vector predication instruction.

FIG. 15 shows a method of handling vector predication. At step 100, the instruction decoder 6 determines whether an instruction to be decoded is a vector predication instruction. If not then the instruction is decoded according to the functionality of the relevant instruction. When a vector predication instruction is encountered, at step 102 the instruction decoder 6 generates control signals to control the processing circuitry to set control information to the VPR 22 depending on the elements comparison operations performed for respective elements of a target vector value specified by the vector predication instruction. At step 104, the instruction decoder 6 controls the processing circuitry to process a predetermined number of subsequent instructions, with masking of an operation associated with a given portion of a portion of a given lane controlled in dependence on the outcome of a corresponding element comparison operation for a corresponding element of the target vector indicated by the control information following the vector predicate instruction.

Figure 16:
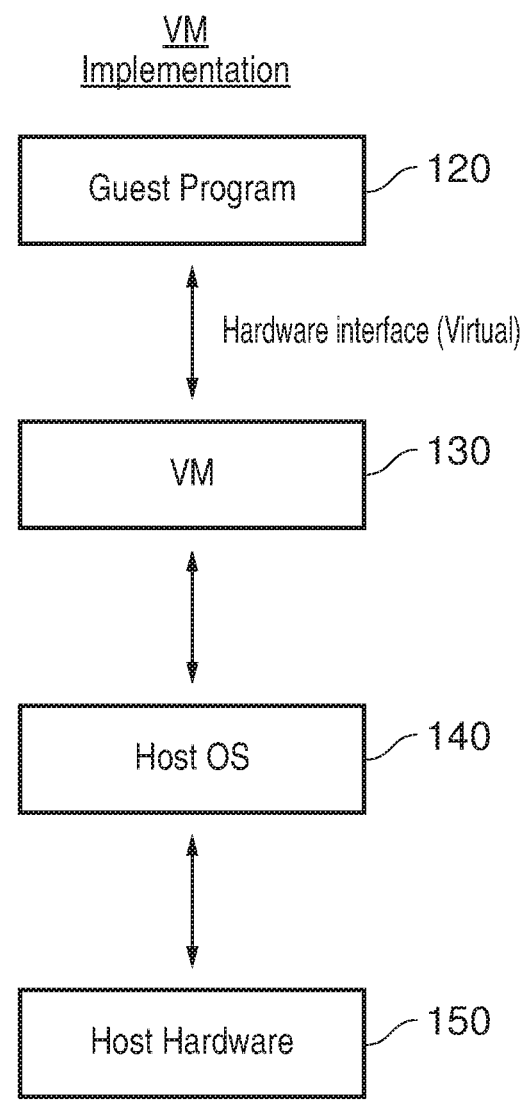
FIG. 16 shows a virtual machine implementation which can be used.

FIG. 16 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 150 running a host operating system 140 supporting a virtual machine program 130. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 130 provides a virtual hardware interface to an guest program 120 which is the same as the hardware interface which would be provided by the real hardware which is the device being modelled by the virtual machine program 130. Thus, the program instructions, including the control of memory accesses described above, may be executed from within the guest program 120 using the virtual machine program 130 to model their interaction with the virtual machine hardware. The guest program 120 may be a bare metal program, or alternatively it may be a guest operating system that runs applications in a similar way to how Host OS 140 runs the virtual machine application 130. It will also be appreciated that there are different types virtual machine, and in some types the virtual machine runs directly on the host hardware 150 without the need for a host OS 140.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
    processing circuitry to perform data processing; and
    an instruction decoder to decode a vector instruction to control the processing circuitry to perform a plurality of lanes of vector processing corresponding to respective data elements of a vector value; wherein
    in response to a vector predication instruction, the instruction decoder is configured to control the processing circuitry to set, in dependence on a plurality of element comparison operations each for determining whether a corresponding data element of a target vector value passes or fails a test condition, control information for controlling processing of a predetermined number of subsequent vector instructions after said vector predication instruction within a sequence of instructions to be processed, wherein said predetermined number is hardwired or identified by the vector predication instruction;
    in response to one of said predetermined number of subsequent vector instructions, the instruction decoder is configured to control the processing circuitry to determine whether to mask an operation associated with a given portion of a given lane of vector processing in dependence on an outcome of the element comparison operation indicated by the control information for a data element of the target vector value corresponding to said given portion;
    in response to at least one type of vector instruction, the instruction decoder is configured to control the processing circuitry to perform an additional operation independent of said plurality of lanes of vector processing;
    the processing circuitry is configured to perform the additional operation independent of the control information when one of said predetermined number of subsequent vector instructions is one of said at least one type of vector instruction;
    for at least one of the predetermined number of subsequent vector instructions, the vector predication instruction identifies whether that subsequent vector instruction is a then-condition vector instruction or an else-condition vector instruction;
    for one of said subsequent vector instructions identified as a then-condition vector instruction, the processing circuitry is configured to mask the operation associated with the given portion of the given lane of vector processing when the test condition was failed for the data element of the target vector value corresponding to said given portion; and
    for one of said subsequent vector instructions identified as an else-condition vector instruction, the processing circuitry is configured to mask the operation associated with the given portion of the given lane of vector processing when the test condition was passed for the data element of the target vector value corresponding to said given portion.

2. The apparatus according to claim 1, wherein in response to the vector predication instruction, the instruction decoder is configured to control the processing circuitry to perform the plurality of element comparison operations.

3. The apparatus according to claim 2, wherein the instruction decoder is configured to support at least one of:
    a vector-comparison vector predication instruction for which each element comparison operation is dependent on a comparison of the corresponding data element of the target vector value with a corresponding element of a further vector value held in a register specified by the vector predication instruction;
    a scalar-comparison vector predication instruction for which each element comparison operation is dependent on a comparison of the corresponding data element of the target vector value with a scalar value held in a register specified by the vector predication instruction; and
    a constant-comparison vector predication instruction for which each element comparison operation is dependent on a comparison of the corresponding data element of the target vector value with a predetermined constant.

4. The apparatus according to claim 1, wherein the vector predication instruction has an encoding capable of identifying, among at least two subsequent vector instructions in the predetermined number of vector instructions, one of the at least two subsequent vector instructions as said else-condition vector instruction and another of the at least two subsequent vector instructions as said then-condition vector instruction.

5. The apparatus according to claim 1, comprising a predicate register to store the control information, wherein in response to one of said predetermined number of subsequent vector instructions for which processing is to be controlled in dependence on the control information, for at least some types of subsequent vector instruction the processing circuitry is configured to read the control information from the same predicate register irrespective of an encoding of the subsequent vector instruction.

6. The apparatus according to claim 1, wherein the control information comprises a plurality of bit flags, each bit flag corresponding to a respective portion of the target vector value and indicative of whether a data element comprising that portion of the target vector value passed or failed the test condition.

7. The apparatus according to claim 1, wherein the control information comprises:
 a predicate field indicative of an outcome of said plurality of element comparison operations; and
 a mask field for controlling which subsequent vector instructions are to be processed dependent on the predicate field.

8. The apparatus according to claim 7, wherein in response to the vector predication instruction, the instruction decoder is configured to control the processing circuitry to set the mask field to an initial value in which said predetermined number is represented by the bit position of the furthest bit having a predetermined bit value from a given end of the mask field.

9. The apparatus according to claim 8, wherein in the initial value, bits between said furthest bit and said given end of the mask field have bit values indicative of whether the subsequent vector instructions are:
 a then-condition vector instruction for which the processing circuitry is configured to mask the operation associated with the given portion of the given lane of vector processing when the test condition was failed for the data element of the target vector value corresponding to said given portion; or
 an else-condition vector instruction for which the processing circuitry is configured to mask the operation associated with the given portion of the given lane of vector processing when the test condition was passed for the data element of the target vector value corresponding to said given portion.

10. The apparatus according to claim 8, wherein in response to one of said predetermined number of subsequent vector instructions, the processing circuitry is configured to shift the mask field towards said given end of the mask field by one bit position.

11. The apparatus according to claim 10, wherein the processing circuitry is configured to invert bits of at least a portion of the predicate field when a bit shifted out of the mask field has a predetermined bit value.

12. The apparatus according to claim 7, wherein in response to a given vector instruction, the processing circuitry is configured to perform a plurality of beats of processing each corresponding to a section of a vector value; and
 the control information comprises a plurality of mask fields each corresponding to a respective beat of processing of the predetermined number of subsequent vector instructions.

13. The apparatus according to claim 12, wherein the processing circuitry is configured to support overlapped execution of first and second vector instructions in which a first subset of beats of the second vector instruction is performed in parallel with a second subset of beats of the first vector instruction.

14. The apparatus according to claim 13, wherein when processing the first subset of beats for the vector predication instruction or one of said predetermined number of subsequent vector instructions, the processing circuitry is configured to use a first mask field of said plurality of mask fields; and
 when processing the second subset of beats for the vector predication instruction or one of said predetermined number of subsequent vector instructions, the processing circuitry is configured to use a second mask field of said plurality of mask fields.

15. The apparatus according to claim 1, wherein the processing circuitry comprises loop predication circuitry to determine, in dependence on a number of data elements to be processed by a loop of vector instructions and a number of data elements per vector value, whether any lanes of vector processing should be masked during a given iteration of the loop; and
 in response to one of said predetermined number of subsequent vector instructions, the instruction decoder is configured to control the processing circuitry to mask the operation associated with the given portion of the given lane of vector processing when the loop predication circuitry determines that the given lane should be masked, independent of the control information set in response to the vector predication instruction.

16. The apparatus according to claim 1, wherein in response to a first type of vector predication instruction, the instruction decoder is configured to control the processing circuitry to set the control information depending on an outcome of said plurality of element comparison operations, independent of a previous predicate outcome indicated by said control information.

17. The apparatus according to claim 1, wherein in response to a second type of vector predication instruction, the instruction decoder is configured to control the processing circuitry to set the control information to indicate a predicate outcome for a given data element of the target vector value which depends on an outcome of a corresponding one of said plurality of element comparison operations and a previous predicate outcome indicated by said control information; and
 following one of said second type of vector predication instruction, in response to one of said predetermined number of subsequent vector instructions, the instruction decoder is configured to control the processing circuitry to control whether to mask an operation associated with the given portion of the given lane of vector processing in dependence on the predicate outcome indicated by the control information for a data element of the target vector value corresponding to the given portion.

18. The apparatus according to claim 1, wherein said instruction decoder is configured to decode a vector comparison instruction to generate control signals to control said processing circuitry to set said control information in dependence upon one of:

a plurality of element comparison operations each for determining whether a corresponding data element of a target vector value passes or fails a test condition; or a previous value of said control information and a plurality of element comparison operations each for determining whether a corresponding data element of a target vector value passes or fails a test condition.

19. The apparatus according to claim 1, wherein the processing circuitry is configured to mask said operation associated with the given portion of the given lane of vector processing by one of:

suppressing updating of a portion of a destination vector register corresponding to said given portion of said given lane;

setting to a predetermined value a portion of the destination vector register corresponding to said given portion of said given lane; and suppressing the vector processing of said given lane.

20. The apparatus according to claim 1, wherein in response to one of said predetermined number of subsequent vector instructions, the processing circuitry is configured to one of:

determine, separately for each portion of a given lane, whether to mask the operation associated with that portion of the given lane of vector processing in dependence on the control information indicated for a data element of the target vector value corresponding to that portion, and determine whether to mask an operation associated with the whole of a given lane of vector processing in dependence on the control information indicated for one data element of the target vector value corresponding to the given lane.

21. The apparatus according to claim 1, wherein the additional operation is an operation to update a pointer relating to an address operation.

22. A data processing method for processing vector instructions for controlling processing circuitry to perform a plurality of lanes of vector processing corresponding to respective data elements of a vector value; the method comprising:

decoding a vector predication instruction to control the processing circuitry to set, in dependence on a plurality of element comparison operations each for determining whether a corresponding data element of a target vector value passes or fails a test condition, control information for controlling processing of a predetermined number of subsequent vector instructions after said vector predication instruction within a sequence of instructions to be processed, wherein said predetermined number is hardwired or identified by the vector predication instruction; and in response to one of said predetermined number of subsequent vector instructions, decoding the subsequent vector instruction to control the processing circuitry to determine whether to mask an operation associated with a given portion of a given lane of vector processing in dependence on an outcome of the element comparison operation indicated by the control information for a data element of the target vector value corresponding to said given portion; wherein when one of said predetermined number of subsequent vector instructions is a type of vector instruction for which the processing circuitry is to perform an additional operation independent of said plurality of lanes of vector processing, the processing circuitry is controlled to perform the additional operation independent of the control information;

for at least one of the predetermined number of subsequent vector instructions, the vector predication instruction identifies whether that subsequent vector instruction is a then-condition vector instruction or an else-condition vector instruction;

for one of said subsequent vector instructions identified as a then-condition vector instruction, the processing circuitry masks the operation associated with the given portion of the given lane of vector processing when the test condition was failed for the data element of the target vector value corresponding to said given portion; and for one of said subsequent vector instructions identified as an else-condition vector instruction, the processing circuitry masks the operation associated with the given portion of the given lane of vector processing when the test condition was passed for the data element of the target vector value corresponding to said given portion.

23. A non-transitory storage medium storing a virtual machine computer program comprising program instructions to control a host data processing apparatus to provide an instruction execution environment corresponding to the apparatus according to claim 1.

* * * * *